US012652152B2

(12) United States Patent
Zhou et al.

(10) Patent No.: US 12,652,152 B2
(45) Date of Patent: Jun. 9, 2026

(54) APPLICATION TIME FOR SEMI-PERSISTENT OR APERIODIC SUBBAND FULL-DUPLEX INDICATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/985,013

(22) Filed: Nov. 10, 2022

(65) Prior Publication Data

US 2024/0163068 A1      May 16, 2024

(51) Int. Cl.
*H04L 5/14*        (2006.01)
*H04W 72/23*        (2023.01)

(52) U.S. Cl.
CPC ............... *H04L 5/14* (2013.01); *H04W 72/23* (2023.01)

(58) Field of Classification Search
CPC .................................. H04L 5/14; H04W 72/23
See application file for complete search history.

(56) References Cited

U.S. PATENT DOCUMENTS

| 8,149,743 | B1 * | 4/2012 | Choksi | ...................... | H04L 5/14 |
| 2020/0229206 | A1 * | 7/2020 | Badic | .................... | G05D 1/225 |
| 2021/0336759 | A1 * | 10/2021 | Abdelghaffar | ........ | H04L 5/0044 |
| 2021/0377926 | A1 * | 12/2021 | Li | ........................ | H04L 5/0053 |
| 2022/0014345 | A1 * | 1/2022 | Abdelghaffar | .... | H04W 72/0446 |
| 2022/0104245 | A1 * | 3/2022 | Xu | ........................ | H04L 5/0053 |
| 2022/0337339 | A1 * | 10/2022 | Zhang | ................... | H04L 1/0025 |
| 2023/0163937 | A1 * | 5/2023 | Awadin | .................... | H04L 5/14 |
| 2024/0107525 | A1 * | 3/2024 | Beigi | ................... | H04L 5/1469 |
| 2024/0163730 | A1 * | 5/2024 | Li | ....................... | H04W 28/20 |

OTHER PUBLICATIONS

International Search Report and Written Opinion—PCT/US2023/076903—ISA/EPO—Feb. 23, 2024.

* cited by examiner

*Primary Examiner* — Ronald B Abelson
(74) *Attorney, Agent, or Firm* — Loza & Loza, LLP

(57)        ABSTRACT

A wireless communication device receives at least one of a semi-persistent subband full-duplex (SBFD) indication or an aperiodic SBFD indication, and receives a downlink symbol or transmits an uplink symbol in a half-duplex mode following expiration of an application time counted from a start time associated with the at least one of the semi-persistent SBFD indication or the aperiodic SBFD indication. A network entity transmits at least one of a semi-persistent subband full-duplex (SBFD) indication or an aperiodic SBFD indication, and receives an uplink symbol and transmits a downlink symbol in an SBFD mode following expiration of an application time counted from a start time associated with the at least one of the semi-persistent SBFD indication or the aperiodic SBFD indication.

30 Claims, 14 Drawing Sheets

Key

Antenna Element of Transmit/DL Panel

Antenna Element of Receive/UL Panel 700    702

710

712

704    706    708

716

714

718

721

720

722

700    702

710

712

704    706    708

726

724

727

728

730

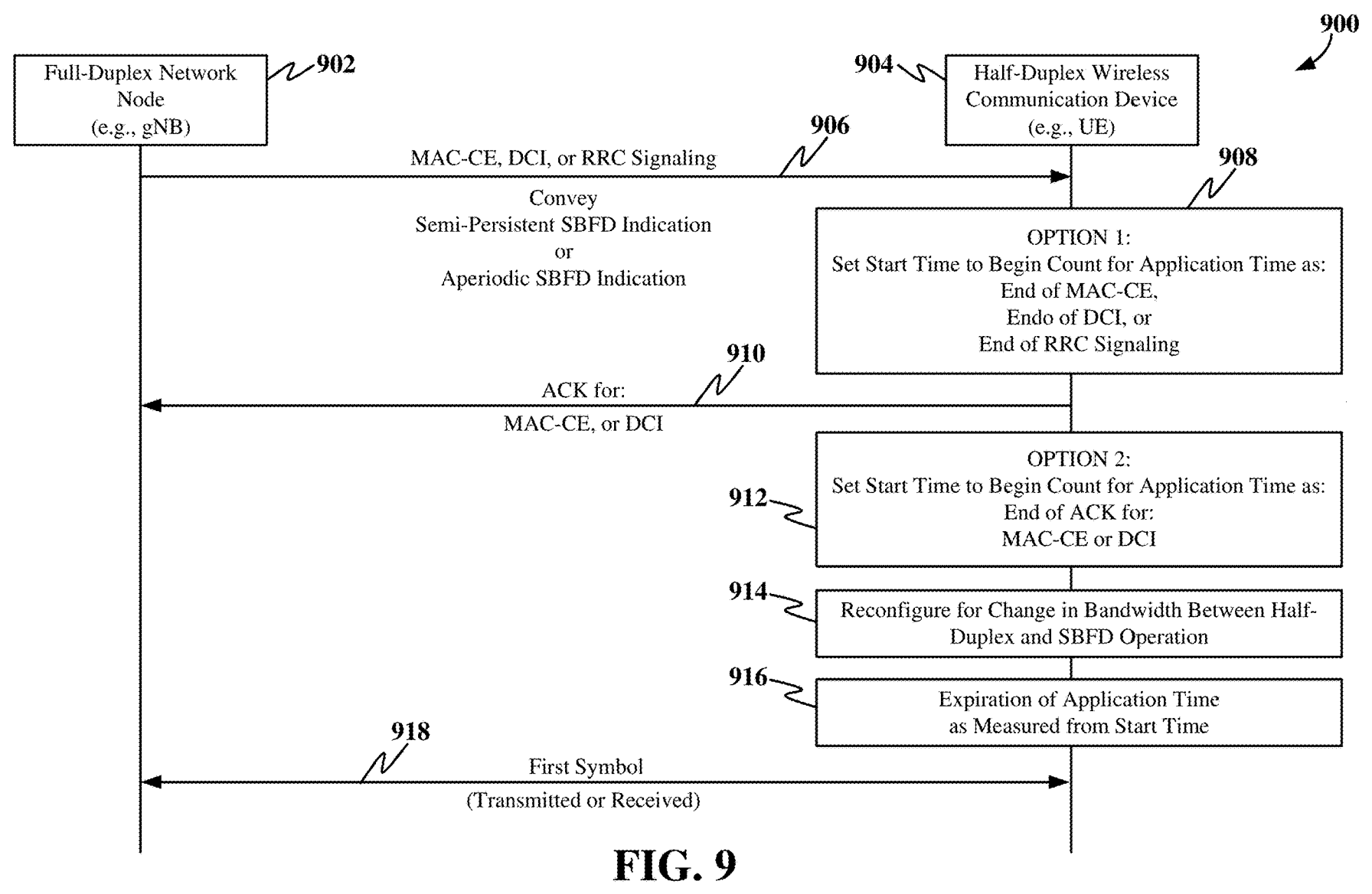

900

902 Full-Duplex Network Node (e.g., gNB)

904 Half-Duplex Wireless Communication Device (e.g., UE)

906 MAC-CE, DCI, or RRC Signaling

Convey Semi-Persistent SBFD Indication or Aperiodic SBFD Indication

908 OPTION 1: Set Start Time to Begin Count for Application Time as: End of MAC-CE, Endo of DCI, or End of RRC Signaling 910 ACK for: MAC-CE, or DCI 912 OPTION 2: Set Start Time to Begin Count for Application Time as: End of ACK for: MAC-CE or DCI 914 Reconfigure for Change in Bandwidth Between Half-Duplex and SBFD Operation 916 Expiration of Application Time as Measured from Start Time 918 First Symbol (Transmitted or Received)

FIG. 9

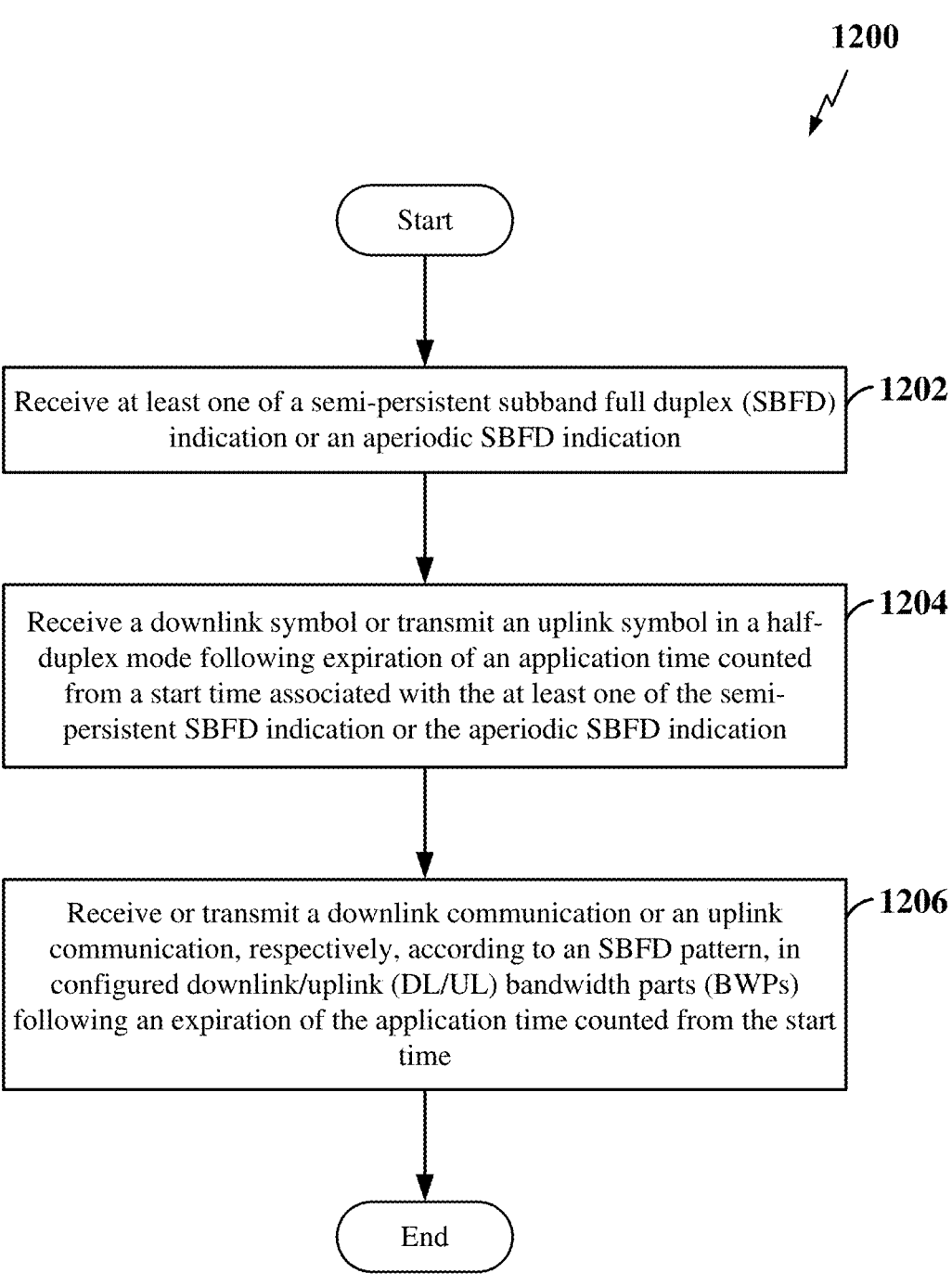

1200

Start

Receive at least one of a semi-persistent subband full duplex (SBFD) indication or an aperiodic SBFD indication
1202

Receive a downlink symbol or transmit an uplink symbol in a half-duplex mode following expiration of an application time counted from a start time associated with the at least one of the semi-persistent SBFD indication or the aperiodic SBFD indication
1204

Receive or transmit a downlink communication or an uplink communication, respectively, according to an SBFD pattern, in configured downlink/uplink (DL/UL) bandwidth parts (BWPs) following an expiration of the application time counted from the start time
1206

End

FIG. 12

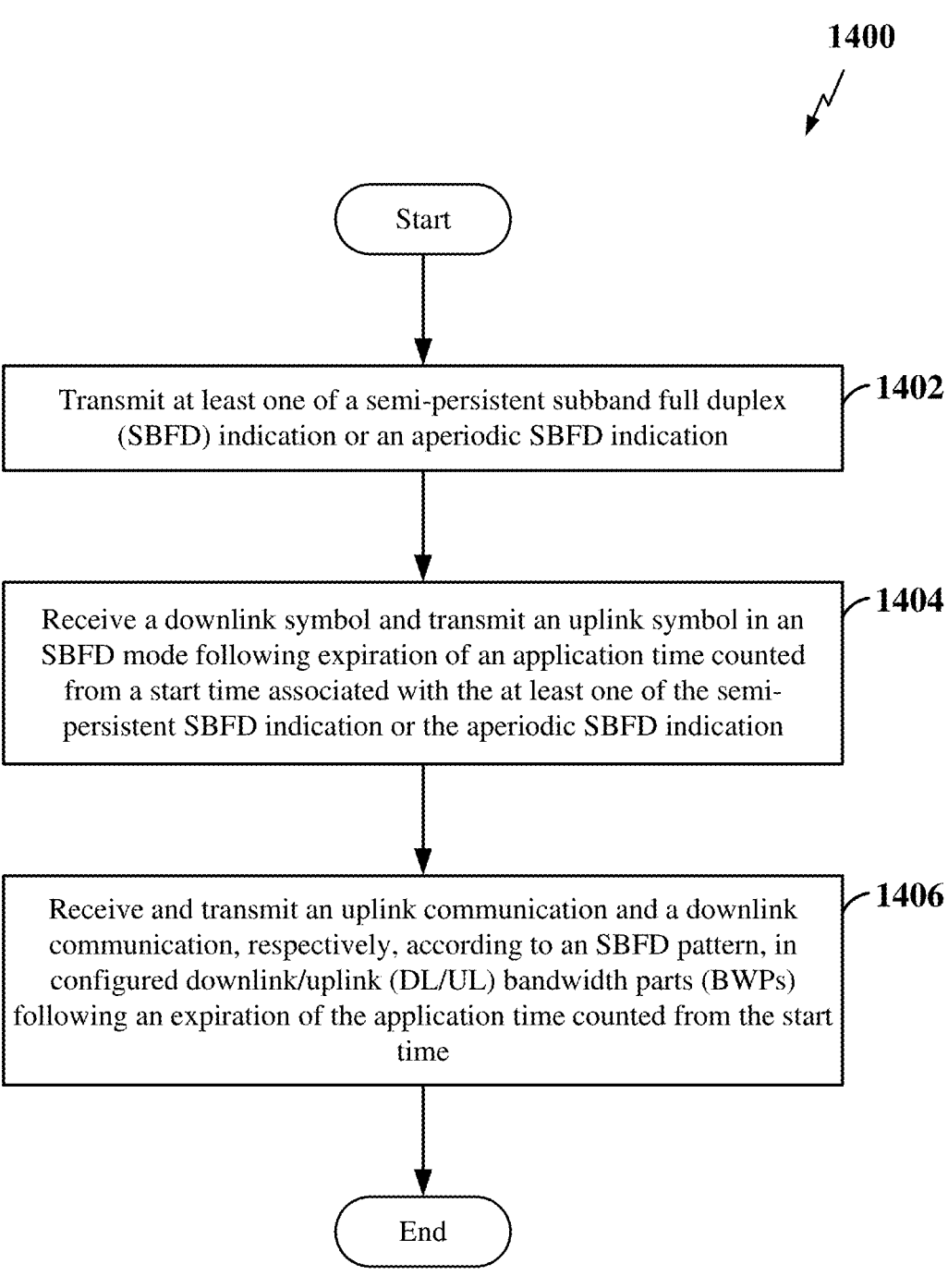

1400

Start

Transmit at least one of a semi-persistent subband full duplex
(SBFD) indication or an aperiodic SBFD indication

1402

Receive a downlink symbol and transmit an uplink symbol in an
SBFD mode following expiration of an application time counted
from a start time associated with the at least one of the semi-
persistent SBFD indication or the aperiodic SBFD indication

1404

Receive and transmit an uplink communication and a downlink
communication, respectively, according to an SBFD pattern, in
configured downlink/uplink (DL/UL) bandwidth parts (BWPs)
following an expiration of the application time counted from the start
time

1406

End

FIG. 14

APPLICATION TIME FOR SEMI-PERSISTENT OR APERIODIC SUBBAND FULL-DUPLEX INDICATION

TECHNICAL FIELD

The technology discussed below relates generally to wireless communication networks, and more particularly, to identification of an application time for a semi-persistent or aperiodic subband full-duplex indication.

INTRODUCTION

In wireless communication systems, such as those specified under standards for 5G New Radio (NR), a base station and a user equipment exchange signals using various duplex modes. Duplex modes include half-duplex and full-duplex. In half-duplex communication, only one node (e.g., user equipment (UE) or base station) can transmit or receive at a given time. In full-duplex communication, one or more nodes (e.g., UE and/or base station) can transmit and receive at the same time (e.g., simultaneous transmission and reception at a node). An example of half-duplex communication is time division duplex (TDD) communication. In 5G NR TDD, uplink signaling (e.g., from a UE to a base station) and downlink signaling (e.g., from the base station to the UE) are separately scheduled in time. Thus, uplink and downlink communications do not occur simultaneously. However, uplink and downlink communications may be transmitted on the same frequencies (e.g., on the same carrier). An example of full-duplex communication is frequency division duplex (FDD) communication. In 5G NR FDD, uplink signaling and downlink signaling are simultaneously scheduled in time; however, uplink and downlink may be transmitted at different frequencies (e.g., on different and spaced apart carriers). One example of a full-duplex (FD) mode of communication is subband full-duplex (SBFD).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device is described. The wireless communication device includes a memory and a processor coupled to the memory. According to the example, the processor is configured to receive at least one of a semi-persistent subband full-duplex (SBFD) indication or an aperiodic SBFD indication, and receive a downlink symbol or transmit an uplink symbol in a half-duplex mode following expiration of an application time counted from a start time associated with the at least one of the semi-persistent SBFD indication or the aperiodic SBFD indication.

In another example, a method of wireless communication at a wireless communication device is described. In the example, the method includes receiving at least one of a semi-persistent subband full-duplex (SBFD) indication or an aperiodic SBFD indication, and receiving a downlink symbol or transmitting an uplink symbol in a half-duplex mode following an expiration of an application time counted from a start time associated with the at least one of the semi-persistent SBFD indication or the aperiodic SBFD indication.

In another example, wireless communication device configured for wireless communication is described. The wireless communication device (e.g., an apparatus) includes means for receiving at least one of a semi-persistent subband full-duplex (SBFD) indication or an aperiodic SBFD indication, and means for receiving a downlink symbol or transmitting an uplink symbol in a half-duplex mode following expiration of an application time counted from a start time associated with the at least one of the semi-persistent SBFD indication or the aperiodic SBFD indication.

In still another example, a non-transitory computer-readable medium storing computer-executable code is described. The computer-executable code includes code for causing a wireless communication device (e.g., an apparatus) to receive at least one of a semi-persistent subband full-duplex (SBFD) indication or an aperiodic SBFD indication, and receive a downlink symbol or transmit an uplink symbol in a half-duplex mode following expiration of an application time counted from a start time associated with the at least one of the semi-persistent SBFD indication or the aperiodic SBFD indication.

According to another example, a network entity is described. The network entity includes a memory and a processor coupled to the memory. In the example, the processor is configured to: transmit at least one of a semi-persistent subband full-duplex (SBFD) indication or an aperiodic SBFD indication, and receive an uplink symbol and transmit a downlink symbol in an SBFD mode following expiration of an application time counted from a start time associated with the at least one of the semi-persistent SBFD indication or the aperiodic SBFD indication.

In another example, a method of wireless communication at a network entity is disclosed. The method includes transmitting at least one of a semi-persistent subband full-duplex (SBFD) indication or an aperiodic SBFD indication, and receiving an uplink symbol and transmitting a downlink symbol in an SBFD mode following expiration of an application time counted from a start time associated with the at least one of the semi-persistent SBFD indication or the aperiodic SBFD indication.

In another example, a network entity (e.g., an apparatus) configured for wireless communication is described. The network entity includes at least one means for transmitting at least one of a semi-persistent subband full-duplex (SBFD) indication or an aperiodic SBFD indication, and means for receiving an uplink symbol and transmitting a downlink symbol in an SBFD mode following expiration of an application time counted from a start time associated with the at least one of the semi-persistent SBFD indication or the aperiodic SBFD indication.

In another example, a non-transitory computer-readable medium storing computer-executable code is described. The computer-executable code includes code for causing a network entity (e.g., an apparatus) to transmit at least one of a semi-persistent subband full-duplex (SBFD) indication or an aperiodic SBFD indication, and receive an uplink symbol and transmit a downlink symbol in an SBFD mode following expiration of an application time counted from a start time associated with the at least one of the semi-persistent SBFD indication or the aperiodic SBFD indication.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 9 is a call flow diagram illustrating two options regarding a definition of a start time from which to count an application time following receipt of: a semi-persistent SBFD indication or an aperiodic SBFD indication according to some aspects of the disclosure.

FIG. 12 is a flow chart illustrating an example process of wireless communication in a wireless communication network at a wireless communication device according to some aspects of the disclosure.

FIG. 14 is a flow chart illustrating an exemplary process of wireless communication in a wireless communication network at a network entity according to some aspects of the disclosure.

DETAILED DESCRIPTION

Figure 1:
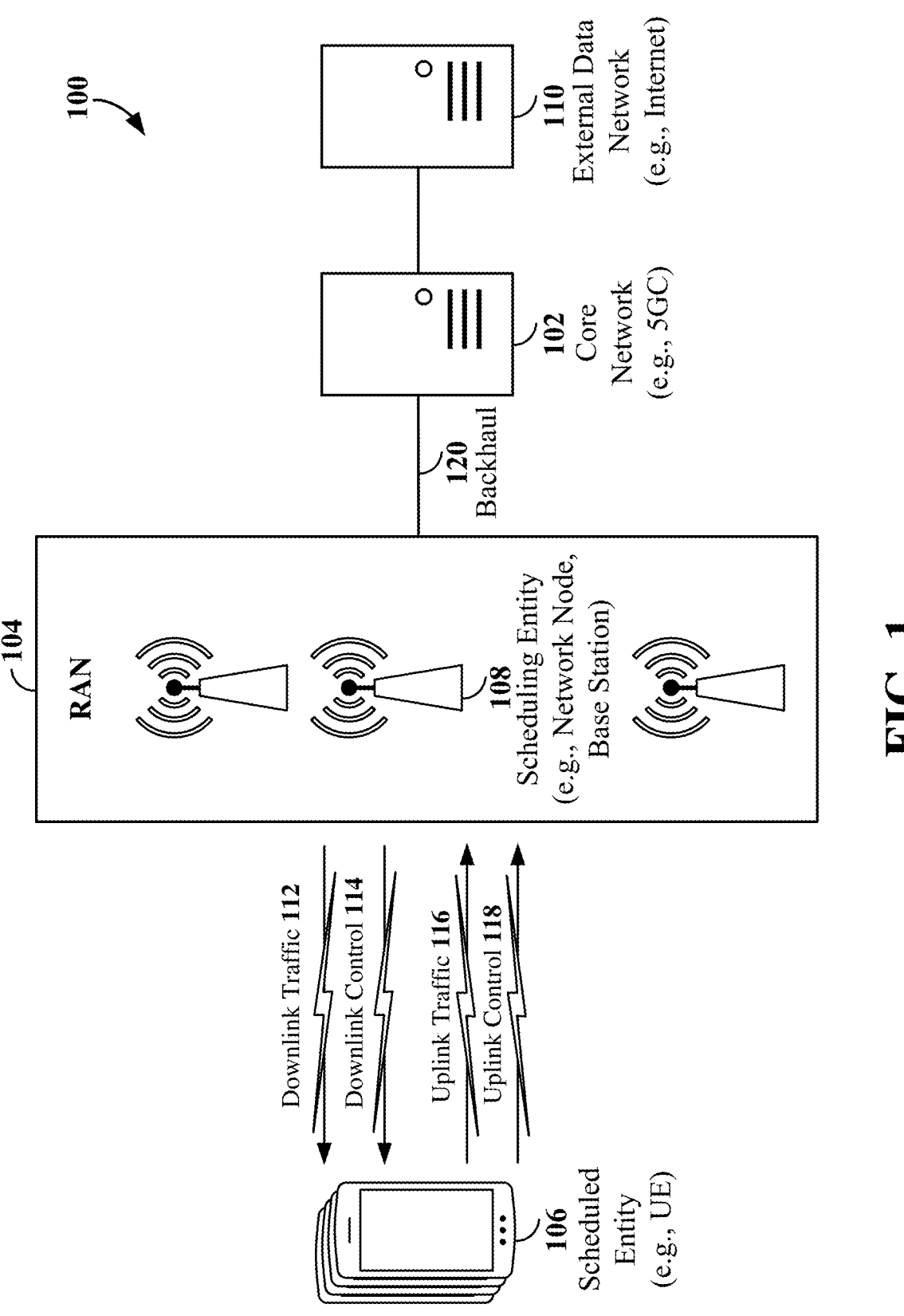
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some examples, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or user equipment (UE)), end-user devices, etc. of varying sizes, shapes, and constitution.

Described herein are techniques directed toward a setting of a start time associated with receipt of a semi-persistent (SP) subband full-duplex (SBFD) indication or an aperiodic (AP) SBFD indication by a half-duplex (HD) wireless communication device (e.g., a UE). The SP SBFD indication or the AP SBFD indication may be conveyed to the HD wireless communication device from a full-duplex network entity (e.g., a gNB). Described herein are also apparatus and methods directed toward an establishment of an application time counted from the start time. The application time (also referred to herein as a switching time) may be a time utilized by the HD wireless communication device to reconfigure/retune RF and/or baseband parameters. Reconfiguration may be performed in response to changing of bandwidths, at the HD wireless communication device, between a first bandwidth associated with a half-duplex downlink or uplink and a second bandwidth associated with an uplink subband or a downlink subband of an SBFD communication.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities 108 (e.g., base stations, gNBs, TRPs, scheduling entities). Broadly, a network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some examples, a network entity may be a network element in a radio access network responsible for radio transmission and reception in one or more cells to or from a UE. In different technologies, standards, or contexts, a network entity may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a network entity may include two or more TRPs that may be collocated or non-collocated. Each TRP may communicate on the same or different carrier frequency within the same or different frequency band. In examples where the RAN 104 operates according to both the LTE and 5G NR standards, one of the network entities may be an LTE network entity, while another network entity may be a 5G NR network entity.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF-chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a network entity (e.g., network entity 108) to one or more UEs (e.g., similar to UE 106) may be referred to as downlink (DL) transmission. In accordance with certain aspects of the present disclosure, the term downlink may refer to a point-to-multipoint transmission originating at a network entity (e.g., network entity 108). Another way to describe this scheme may be to use the term broadcast channel multiplexing. Transmissions from a UE (e.g., UE 106) to a network entity (e.g., network entity 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, where a scheduling entity (e.g., a network entity 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Network entities 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or downlink control information 114 and/or uplink traffic 116 and/or downlink traffic 112 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, network entity 108 may include a backhaul interface for communication with a backhaul portion 120 of the wireless communication system 100. The backhaul portion 120 may provide a link between a network entity 108 and the core network 102. Further, in some examples, a backhaul network may provide interconnection between the respective network entities 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5G core (5GC)). In other examples, the core network 102 may be configured according to a 4G evolved packet core (EPC), or any other suitable standard or configuration.

Figure 2:
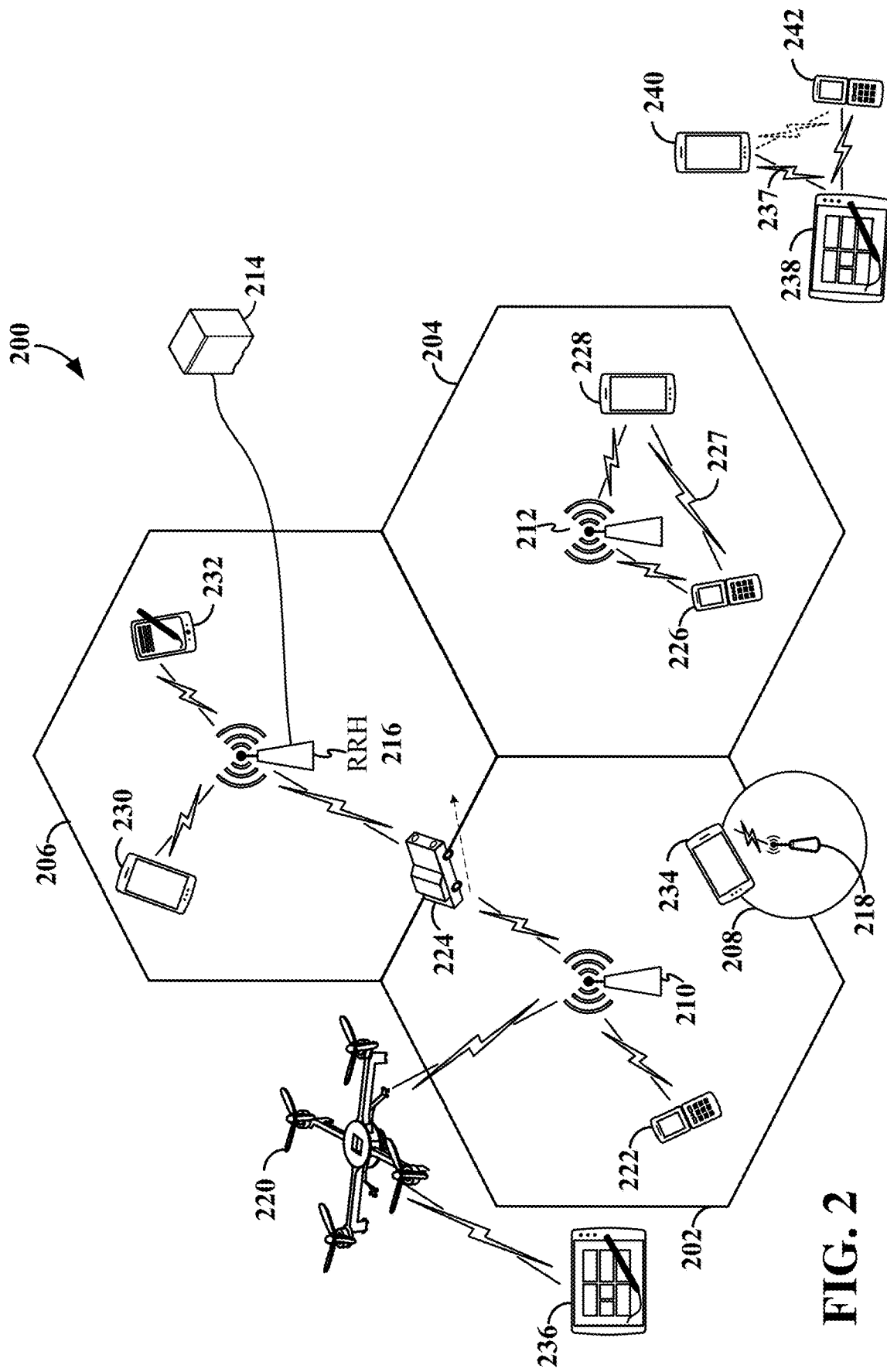
FIG. 2 is a schematic illustration of an example of a radio access network (RAN) according to some aspects of the disclosure.

Referring now to FIG. 2, as an illustrative example without limitation, a schematic illustration of an example of a radio access network (RAN) 200 according to some aspects of the disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or network entity. FIG. 2 illustrates cells 202, 204, 206, and 208, each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various network entity arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a small cell, a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of network entities (e.g., base stations, gNBs, TRPs, scheduling entities) and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, UE 234 may be in communication with base station 218, and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network entity and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into the mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different subbands of the carrier bandwidth. This type of full-duplex communication may be referred to herein as subband full-duplex (SBFD), also known as flexible duplex.

Deployment of communication systems, such as 5G new radio (NR) systems, may be arranged in multiple manners with various components or constituent parts. In a 5G NR system, or network, a network entity, a network entity, a mobility element of a network, a radio access network (RAN) node, a core network entity, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
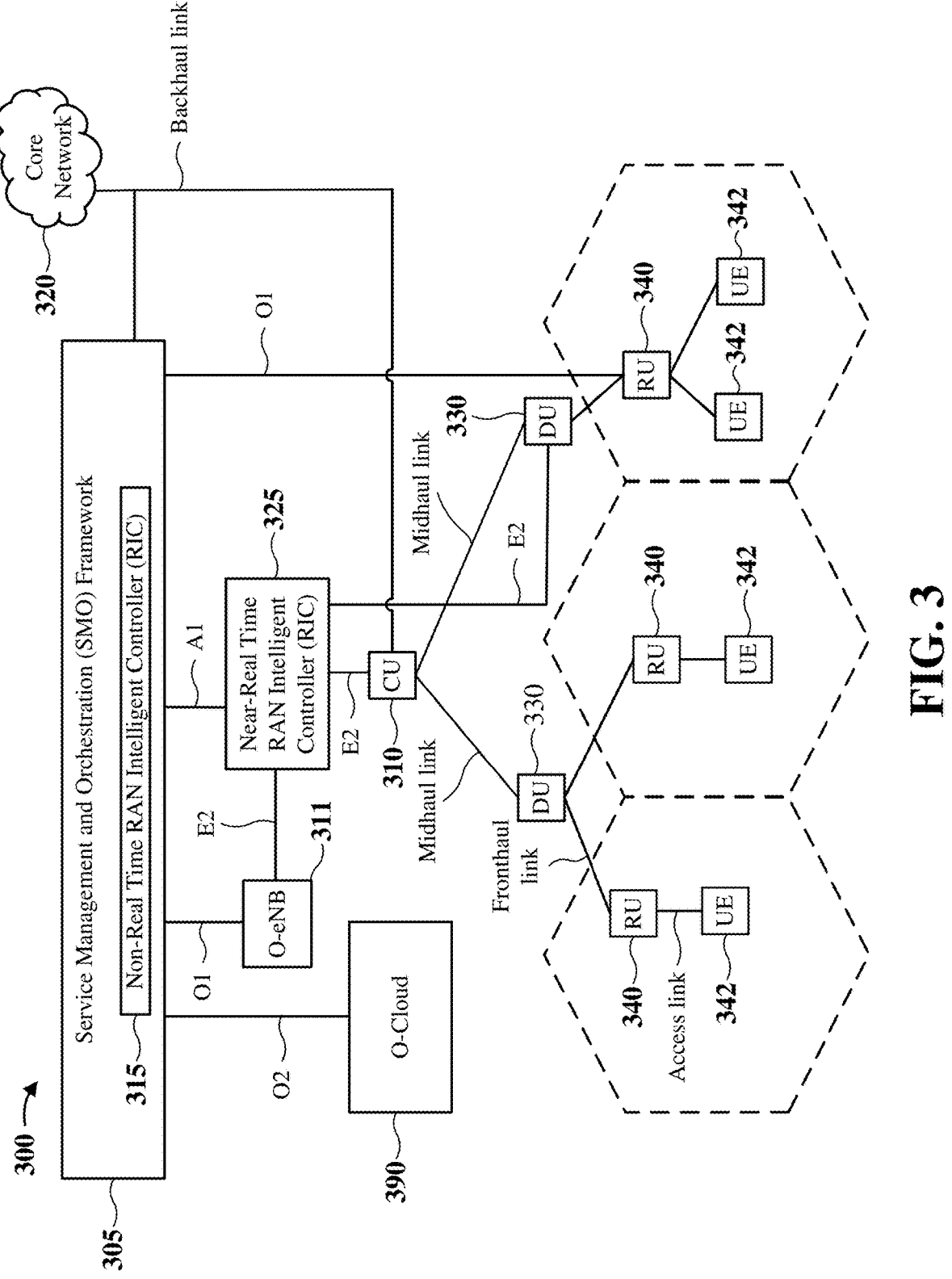
FIG. 3 is a schematic illustration of an example disaggregated base station architecture according to some aspects of the disclosure.

FIG. 3 is a schematic illustration of an example disaggregated base station 300 architecture according to some aspects of the disclosure. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 342 via one or more radio frequency (RF) access links. In some implementations, the UE 342 may be simultaneously served by multiple RUs 340. UE 342 may be the same or similar to any of the UEs or scheduled entities illustrated and described in connection with FIG. 1 and FIG. 2, for example.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation, and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 342. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described hereinbelow. That is, while some examples of the present disclosure may focus on an OFDM link for clarity, it should be understood that the same principles may be applied as well to SC-FDMA waveforms.

Figure 4:
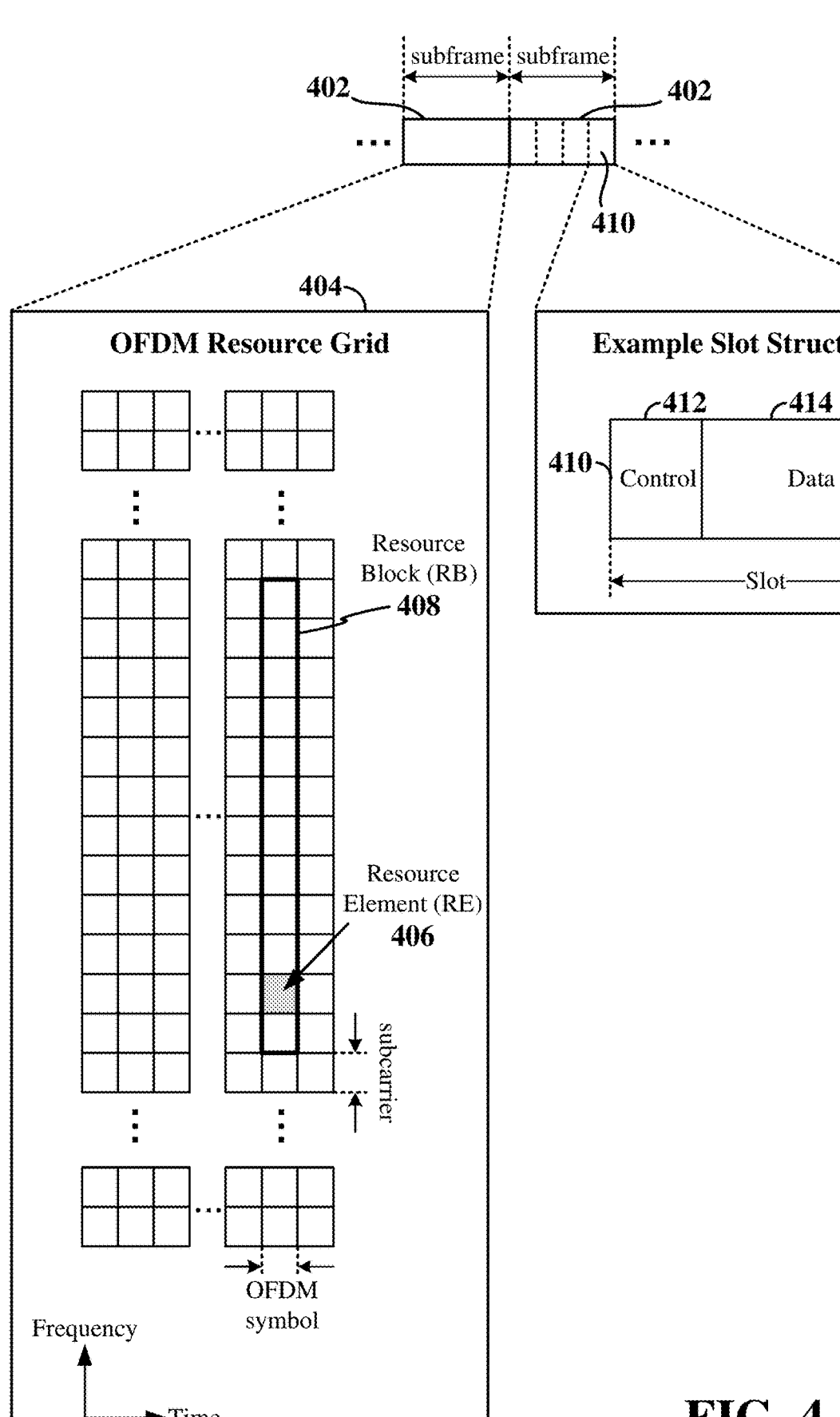
FIG. 4 is an expanded view of an exemplary subframe, showing an orthogonal frequency divisional multiplexing (OFDM) resource grid according to some aspects of the disclosure.

Referring now to FIG. 4, an expanded view of an exemplary subframe 402 is illustrated, showing an OFDM resource grid according to some aspects of the disclosure. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), subband, or bandwidth part (BWP). A set of subbands or BWPs may span the entire bandwidth. Scheduling of scheduled entities (e.g., UEs) for downlink, uplink, or sidelink transmissions may involve scheduling one or more resource elements 406 within one or more subbands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a network entity (e.g., a base station, a gNB, a TRP, a scheduling entity), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a network entity, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a network entity) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The network entity may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A network entity may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data. Such data may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information (e.g., a quantity of the bits of information), may be a controlled parameter, based on the modulation and coding scheme (MCS) and the number of RBs in a given transmission.

The channels or carriers described above in connection with FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
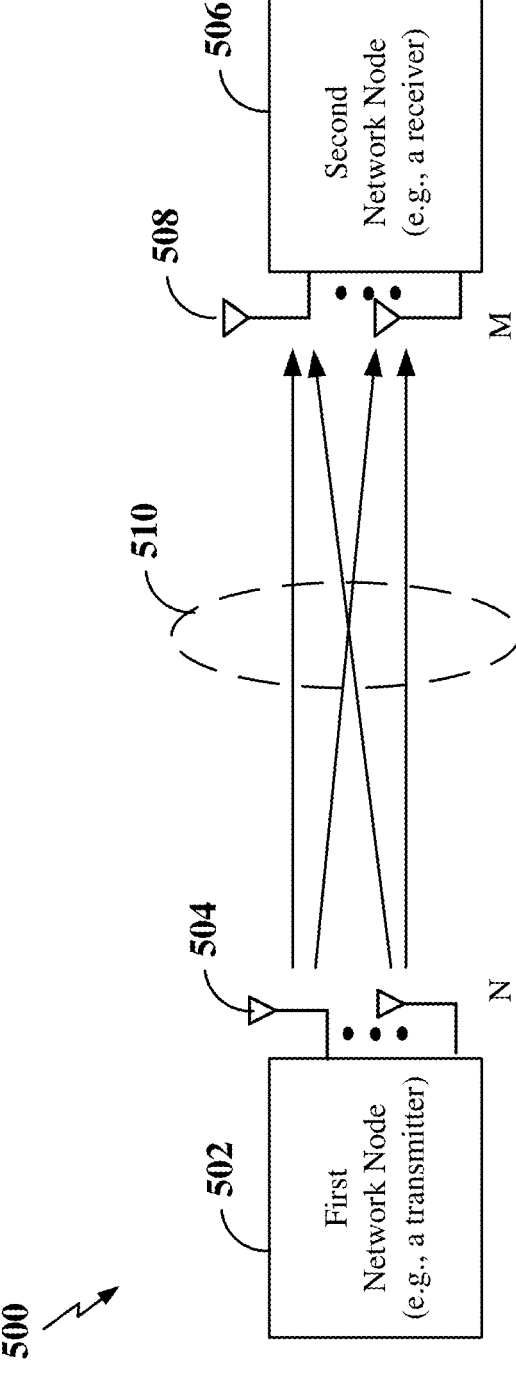
FIG. 5 is a block diagram illustrating an example of a wireless communication system supporting beamforming and/or multiple-input multiple-output (MIMO) communication according to some aspects of the disclosure.

In some aspects of the disclosure, the scheduling entity and/or scheduled entity may be configured for beamforming and/or multiple-input multiple-output (MIMO) technology. FIG. 5 is a block diagram illustrates an example of a wireless communication system 500 supporting beamforming and/or MIMO according to some aspects of the disclosure. In a MIMO system, a first network entity 502 (e.g., a transmitter) includes multiple transmit antennas 504 (e.g., N transmit antennas) and a second network entity 506 (e.g., a receiver) includes multiple receive antennas 508 (e.g., M receive antennas). Thus, there are N×M signal paths 510 from the transmit antennas 504 to the receive antennas 508. Each of the first network entity 502 and the second network entity 506 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 500 (MIMO system) is limited by the number of transmit or receive antennas 504 or 508, whichever is lower. In addition, the channel conditions at the UE, as well as other considerations, such as the available resources at the base station, may also affect the transmission rank. For example, the rank (and, therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The second network entity 506 may then reconstruct the data streams using the received signals from each receive antenna 508.

Beamforming is a signal processing technique that may be used at the first network entity 502 or second network entity 506 to shape or steer an antenna beam (e.g., a transmit beam or receive beam) along a spatial path between the first network entity 502 and the second network entity 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the first network entity 502 or second network entity 506 may apply amplitude and/or phase offsets to signals transmitted or received from each of the antennas 504 or 508 associated with the first network entity 502 or second network entity 506.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (e.g., UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via an SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of an SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 6:
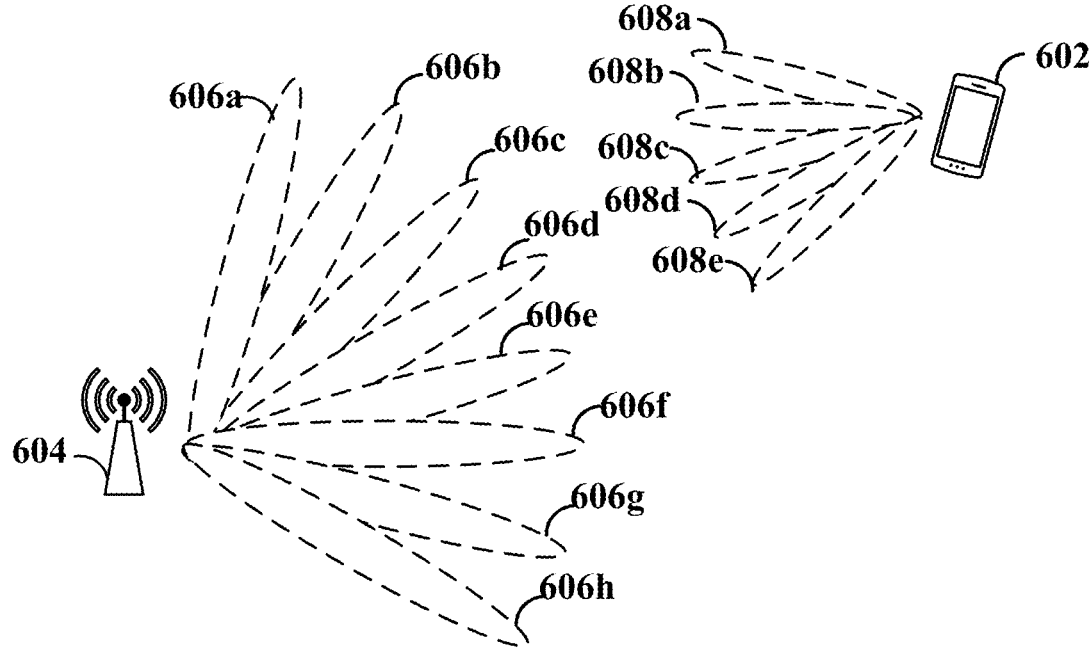
FIG. 6 is a diagram illustrating an example of communication between a first network entity and a second network entity using beamformed signals according to some aspects of the disclosure.

FIG. 6 is a diagram illustrating an example of communication between a first network entity (e.g., radio access network (RAN) node, a gNB (referred to hereafter as a network entity 604) and a second network entity (e.g., wireless communication device, a UE) (referred to hereafter as a UE 602) using beamformed signals according to some aspects of the disclosure. The first network entity 604 may be any of the network entities (e.g., base stations, gNBs, TRPs, scheduling entities, CU/DU/RU) illustrated in FIGS. 1, 2, 3, and/or 5, and the UE 602 may be any of the UEs or scheduled entities illustrated in FIGS. 1, 2, 3, and/or 5.

The network entity 604 may generally be capable of communicating with the UE 602 using one or more transmit beams, and the UE 602 may further be capable of communicating with the network entity 604 using one or more receive beams. As used herein, the term transmit beam refers to a beam on the network entity 604 that may be utilized for downlink or uplink communication with the UE 602. In addition, the term receive beam refers to a beam on the UE 602 that may be utilized for downlink or uplink communication with the network entity 604.

In the example shown in FIG. 6, the network entity 604 is configured to generate a plurality of transmit beams 606a-606h, each associated with a different spatial direction. In addition, the UE 602 is configured to generate a plurality of receive beams 608a-608e, each associated with a different spatial direction. It should be noted that while some beams are illustrated as adjacent to one another, such an arrangement may be different in different aspects. For example, transmit beams 606a-606h transmitted during a same symbol may not be adjacent to one another. In some examples, the network entity 604 and UE 602 may each transmit more or less beams distributed in all directions (e.g., 360 degrees) and in three-dimensions. In addition, the transmit beams 606a-606h may include beams of varying beam width. For example, the network entity 604 may transmit certain signals (e.g., SSBs) on wider beams and other signals (e.g., CSI-RSs) on narrower beams.

The network entity 604 and UE 602 may select one or more transmit beams 606a-606h on the network entity 604 and one or more receive beams 608a-608e on the UE 602 for communication of uplink and downlink signals therebetween using a beam management procedure. In one example, during initial cell acquisition, the UE 602 may perform a P1 beam management procedure to scan the plurality of transmit beams 606a-606h on the plurality of receive beams 608a-608e to select a beam pair link (e.g., one of the transmit beams 606a-606h and one of the receive beams 608a-608e) for a physical random access channel (PRACH) procedure for initial access to the cell. For example, periodic SSB beam sweeping may be implemented on the network entity 604 at certain intervals (e.g., based on the SSB periodicity). Thus, the network entity 604 may be configured to sweep or transmit an SSB on each of a plurality of wider transmit beams 606a-606h during the beam sweeping interval. The UE 602 may measure the reference signal received power (RSRP) of each of the SSB transmitted on each of the transmit beams 606a-606h on each of the receive beams 608a-608e of the UE 602. The UE 602 may select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the network entity 604 and UE 602 may perform a P2 beam management procedure for beam refinement at the network entity 604. For example, the network entity 604 may be configured to sweep or transmit a CSI-RS on each of a plurality of narrower transmit beams 606a-606h. Each of the narrower CSI-RS beams may be a sub-beam (not shown) of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 602 may be configured to scan the plurality of CSI-RS transmit beams 606a-606h on the plurality of receive beams 608a-608e. The UE 602 may then perform beam measurements (e.g., RSRP, SINR, etc.) of the received CSI-RSs on each of the receive beams 608a-608e to determine the respective beam quality of each of the CSI-RS transmit beams 606a-606h as measured on each of the receive beams 608a-608e.

The UE 602 can then generate and transmit a Layer 1 (L1) measurement report, including the respective beam index (e.g., CSI-RS resource indicator (CRI)) and beam measurement (e.g., RSRP, SINR) of one or more of the CSI-RS transmit beams 606a-606h on one or more of the receive beams 608a-608e to the network entity 604. The network entity 604 may then select one or more CSI-RS transmit beams on which to transmit unicast downlink control information and/or user data traffic to the UE 602. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE 602 for each selected serving CSI-RS transmit beam to form a respective downlink beam pair link (BPL) for each selected serving CSI-RS transmit beam. For example, the UE 602 may utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, the network entity 604 may configure the UE 602 to perform SSB beam measurements and provide an L1 measurement report including beam measurements of SSB transmit beams 606a-606h. For example, the network entity 604 may configure the UE 602 to perform SSB beam measurements and/or CSI-RS beam measurements for beam failure detection (BFD), beam failure recovery (BFR), cell reselection, beam tracking (e.g., for a mobile UE 602 and/or network entity 604), or other beam optimization purpose.

In addition, when the channel is reciprocal, the transmit and receive beams may be selected using an uplink beam management scheme. In an example, the UE 602 may be configured to sweep or transmit on each of a plurality of receive beams 608a-608e. For example, the UE 602 may transmit an SRS on each beam in the different beam directions. In addition, the network entity 604 may be configured to receive the uplink beam reference signals on a plurality of transmit beams 606a-606h. The network entity 604 may then perform beam measurements (e.g., RSRP, SINR, etc.) of the beam reference signals on each of the transmit beams 606a-606h to determine the respective beam quality of each of the receive beams 608a-608e as measured on each of the transmit beams 606a-606h.

The network entity 604 may then select one or more transmit beams on which to communicate downlink control information and/or user data traffic to the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In addition to L1 measurement reports, the UE 602 can further utilize the beam reference signals to estimate the channel quality of the channel between the network entity 604 and the UE 602. For example, the UE 602 may measure the SINR of each received CSI-RS and generate a CSI report based on the measured SINR. The CSI report may include, for example, a channel quality indicator (CQI), rank indicator (RI), precoding matrix indicator (PMI), and/or layer indicator (LI). The scheduling entity may use the CSI report to select a rank for the scheduled entity, along with a precoding matrix and a MCS to use for future downlink transmissions to the scheduled entity. The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The LI may be utilized to indicate which column of the precoding matrix of the reported PMI corresponds to the strongest layer codeword corresponding to the largest reported wideband CQI.

In one example, a single CSI-RS transmit beam (e.g., transmit beam 606d) on the network entity 604 and a single receive beam (e.g., receive beam 608c) on the UE 602 may form a single BPL used for communication between the network entity 604 and the UE 602. In another example, multiple CSI-RS transmit beams (e.g., transmit beams 606c, 606d, and 606e) on the network entity 604 and a single receive beam (e.g., receive beam 608c) on the UE 602 may form respective BPLs used for communication between the network entity 604 and the UE 602. In another example, multiple CSI-RS transmit beams (e.g., transmit beams 606c, 606d, and 606e) on the network entity 604 and multiple receive beams (e.g., receive beams 608c and 608d) on the UE 602 may form multiple BPLs used for communication between the network entity 604 and the UE 602. In this example, a first BPL may include transmit beam 606c and receive beam 608c, a second BPL may include transmit beam 608d and receive beam 608c, and a third BPL may include transmit beam 608e and receive beam 608d.

Figures 7A, 7B:
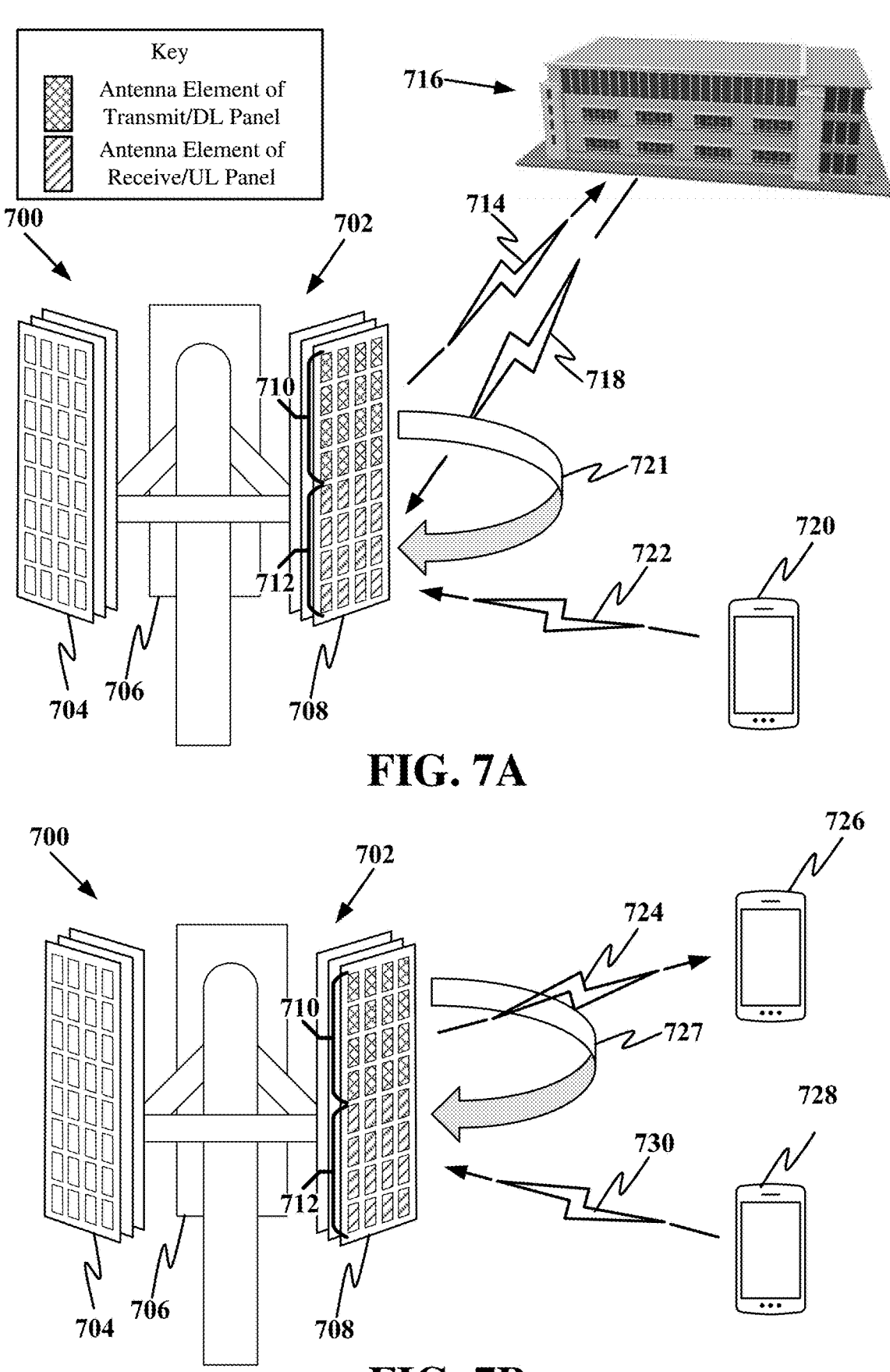
FIGS. 7A and 7B are schematic illustrations of a wireless communication network including a network entity represented by a base station tower, a first half-duplex (HD) user equipment (UE), a second HD UE, and a third HD UE according to some aspects of the disclosure.

A network entity (e.g., a gNB) may be a full-duplex network entity and a UE (e.g., a wireless communication device) may be a full-duplex or a half-duplex UE. By way of example, aspects of the disclosure may be directed to full-duplex (FD) network entities and half-duplex (HD) UEs. FIGS. 7A and 7B are schematic illustrations of a wireless communication network 700 including a FD network entity 702 (generally represented as a base station tower and associated antenna arrays), a HD UE 720, a first HD UE 726, and a second HD UE 728 according to some aspects of the disclosure. The FD network entity 702 may be any of the network entities (e.g., network entities, base stations, gNBs, TRPs, scheduling entities, CU/DU/RU) illustrated in FIGS. 1, 2, 3, 5, and/or 6, and the HD UE 720, the first HD UE 726, and the second HD UE 728 may be any of the UEs or scheduled entities illustrated in FIGS. 1, 2, 3, 5, and/or 6.

In FIGS. 7A and 7B, the FD network entity 702 includes a first antenna array 704 facing in a first direction, a second antenna array 706 facing in a second direction, and a third antenna array 708 facing in a third direction. The first, second, and third directions may be angularly separated by about 120 degrees relative to one another, thus providing 360 degree coverage around the tower of the FD network entity 702.

Each of the first, second, and third antenna arrays 704, 706, 708 may be divided into two panels ((e.g., third antenna array 709 is depicted with a first panel 710 and a second panel 712) with a physical separation (not shown) therebetween. Each of the two panels may be a subarray of antenna elements, as shown. A given panel may transmit and/or receive a beam or a beam group. Each of the first, second, and third antenna arrays 704, 706, 708 may be configured for MU-MIMO operation. More specifically, any one or more of the first, second, and third antenna arrays 704, 706, 708 may be configured for downlink/uplink (DL/UL) MU-MIMO (i.e., full-duplex, including subband full-duplex) operation. Of course, any one or more of the first, second, and third antenna arrays 704, 706, 708 may be configured for DL MU-MIMO (e.g., simultaneous downlink transmissions of signals to at least two UEs) or for UL MU-MIMO (e.g., simultaneous uplink reception of signals from at least two UEs) operation In FIGS. 7A and 7B, the third antenna array 708 of the FD network entity 702 is depicted as being configured with a first panel 710 and a second panel 712. In the example, the first panel 710 and the second panel 712 are laterally displaced from one another (e.g., they do not overlap). The first panel 710 is exemplified as a transmit panel and the second panel 712 is exemplified as a receive panel.

Turning to FIG. 7A, the FD network entity 702 may engage in communication with a UE (not shown) inside of or in front of a building 716. The FD network entity 702 may simultaneously (or substantially simultaneously) engage in communication with an HD UE 720. During a time of simultaneous (or substantially simultaneous) full-duplex transmission of a first signal 714 to the UE inside of or in front of a building 716 from the first panel 710 and reception of a second signal 722 from the HD UE 720 at the second panel 712, a portion of the energy of the first signal 714 may reflect from the building 716. The energy of the first signal 714 reflected from the building 716 is referred to herein as a reflected first signal 718. The reflected first signal 718 may be reflected toward the FD network entity 702 and may be received as interference at the second panel 712 of the third antenna array 708 of the FD network entity 702. Additionally, self-interference 721 from the transmission of the first signal 714 to the UE inside of or in front of a building 716 may also be received as interference at the second panel 712. Other sources of interference may include interference from a neighboring network entity (not shown). Because it is a half-duplex UE, the HD UE 720 does not receive during the time of its uplink transmission of a second signal 722 to the FD network entity 702; therefore, the HD UE 720 receives no self-interference.

Turning to FIG. 7B, a simplified version of FIG. 7A where the building 716 is omitted (therefore, the interference of the type represented by the reflected first signal 718 in FIG. 7A is omitted). A first HD UE 726, self-interference 727, and a second HD UE 728 are represented. FIG. 7B may more clearly depict operation of the FD network entity 702 with the first HD UE 726 and the second HD UE 728. As similarly described in connection with FIG. 7A, the FD network entity 702 may simultaneously (or substantially simultaneously) transmit a third signal 724 to the first HD UE 726 from the first panel 710 and receive a fourth signal 730 from the second HD UE 728 at the second panel 712, where the third signal 724 and the fourth signal 730 are at different frequencies within a given bandwidth. Such simultaneous (or near simultaneous) transmission and reception may be achieved using, for example, SBFD.

Figure 8A:
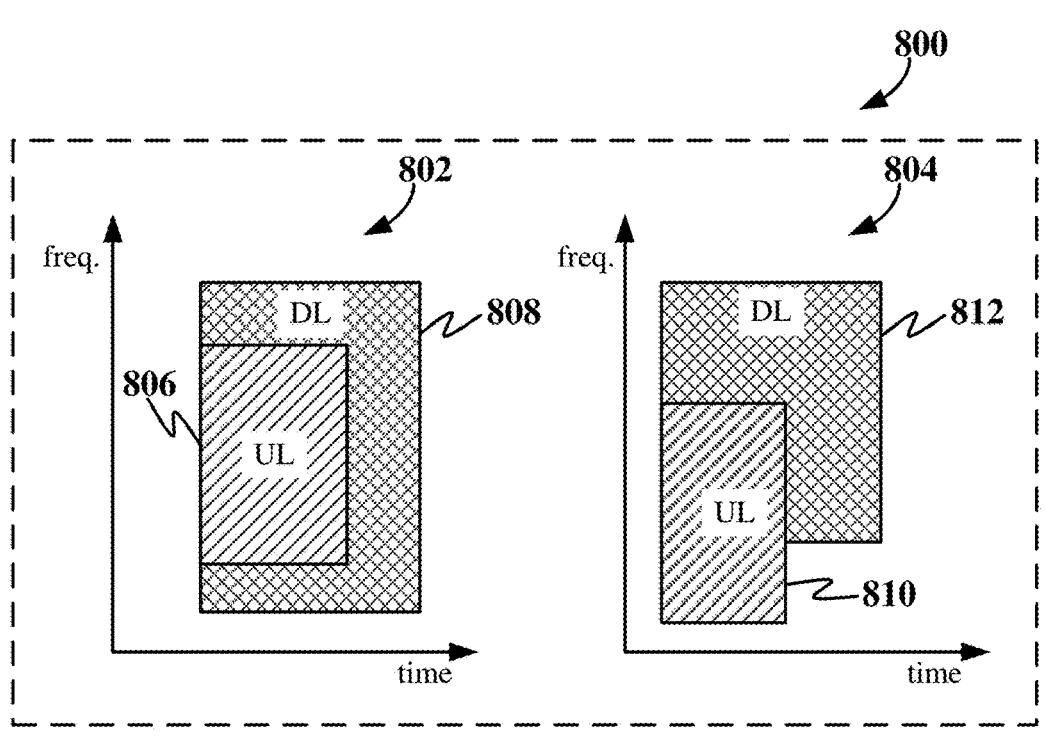
FIGS. 8A and 8B are time-frequency resource diagrams depicting of various examples of full-duplex subbands according to some aspects of the disclosure.
Figure 8B:
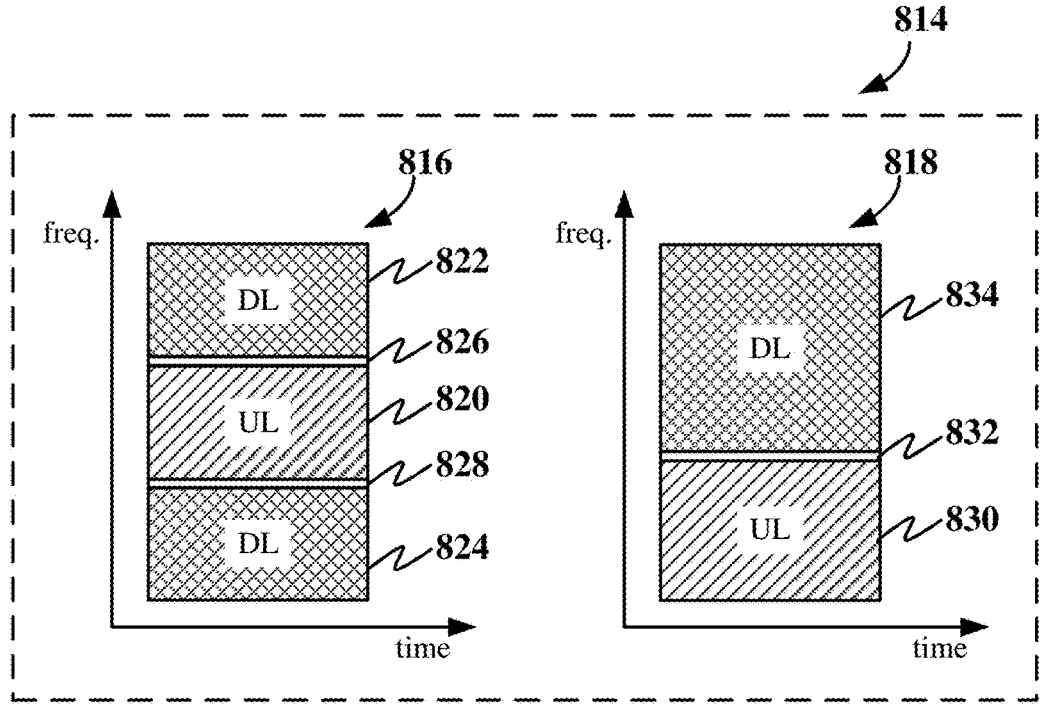

FIGS. 8A and 8B are time-frequency resource diagrams depicting of various examples of full-duplex subbands according to some aspects of the disclosure. FIG. 8A is a diagram illustrating two examples of in-band full-duplex (IBFD) 800 multiplexing according to some aspects of the disclosure. In the examples shown in FIG. 8A, time is illustrated along the horizontal axis while frequency is illustrated along the vertical axis. A first example 802 of IBFD is depicted on the left while a second example 804 is depicted on the right. In the first example 802, the UL time-frequency resources 806 overlap entirely with a portion of the DL time-frequency resources 808. In the second example 804, the UL time-frequency resources 810 partially overlap with a portion of the DL time-frequency resources 812. Accordingly, a device, for example a network entity, a base station, a gNB, a scheduling entity and/or a UE, a scheduled entity, employing IBFD 800 multiplexing may transmit and receive on the same time and frequency resources. That is, the device may transmit and receive at the same time(s) at the same frequency (or frequencies). The UL and DL share the same time and frequency resources. The overlap in time-frequency resources may be complete, as in the first example 802, or partial, as in the second example 804.

FIG. 8B is a diagram illustrating two examples of subband full-duplex (SBFD) 814 multiplexing according to some aspects of the disclosure. In the examples shown in FIG. 8B, time is illustrated along the horizontal axis while frequency is illustrated along the vertical axis. A first example 816 of SBFD is depicted on the left while a second example 818 of SBFD is depicted on the right. In the first example 816, the UL subband 820 are frequency division multiplexed between a first DL subband 822 (i.e., set of higher frequency downlink resources) and a second DL subband 824 (i.e., a set of lower frequency downlink resources). An upper guard band 826 is interposed between the UL subband 820 and the first DL subband 822. A lower guard band 828 is interposed between the UL subband 820 and the second DL subband 824. All frequencies are non-overlapping. In the second example 818, the SBFD UL subband 830 and the DL subband 834 are spaced between a guard band 832. Again, all frequencies are non-overlapping. Accordingly, a device, for example a network entity, a base station, a gNB, a scheduling entity and/or a UE, a scheduled entity, employing SBFD 814 multiplexing may transmit and receive at the same time but in different subbands or BWPs of the same carrier bandwidth (i.e., in different frequency resources in unpaired spectrum within the same carrier bandwidth). As there is no overlap between the frequencies of the uplink and downlink, SBFD as illustrated in the first example 816 and the second example 818 may be referred to a non-overlapping SBFD.

The disclosure relates to a setting of a start time and an establishment of an application time associated with receipt, by a half-duplex wireless communication device (e.g., a UE), of either a semi-persistent (SP) SBFD indication or an aperiodic (AP) SBFD indication from a full-duplex network entity (e.g., a gNB). The half-duplex wireless communication device may need to change baseband parameters in response to the SP SBFD indication or the AP SBFD indication because, for example, a first bandwidth associated with a half-duplex downlink may be greater than a second bandwidth associated with downlink or uplink subbands of an SBFD symbol or slot.

FIG. 9 is a call flow diagram 900 illustrating two options regarding a definition of a start time from which to count an application time (e.g., a time utilized by a half-duplex UE to reconfigure its transmitter/receiver to accommodate a change in bandwidth between half-duplex (HD) and subband full-duplex (SBFD) operation or vice versa) following receipt of: a semi-persistent SBFD indication or an aperiodic SBFD indication. At 906, a full-duplex network entity 902 (e.g., a gNB) communicates a message containing either a semipersistent SBFD indication or an aperiodic SBFD indication to a half-duplex wireless communication device 904 (e.g., a UE). For example, the message may include at least one of a MAC-CE, DCI, or RRC signaling (e.g., via a cell common indication).

At 908, according to a first option, the half-duplex wireless communication device 904 sets a start time from which to begin counting an application time. The application time may be the time utilized by the half-duplex wireless communication device 904 to reconfigure its transmitter/receiver to accommodate the change in bandwidth between half-duplex HD and SBFD operation or vice versa. According to the first option, the start time may be defined as an end of the message. For example, the start time may be defined as an end of at least one of the MAC-CE, the DCI, or the RRC signaling. If the first option is utilized, the half-duplex wireless communication device 904 may start a clock (e.g., an application time clock) (not shown) and begin counting the application time.

At 910, the half-duplex wireless communication device 904 transmits an ACK for the MAC-CE or the DCI, as the case may be. Generally, and ACK is not transmitted in response to RRC signaling.

At 912, according to a second option, the half-duplex wireless communication device 904 sets the start time to begin counting the application time (e.g., the time utilized by the half-duplex wireless communication device 904 to reconfigure its transmitter/receiver to accommodate the change in bandwidth between half-duplex HD and SBFD operation or vice versa). According to the second option, the start time may be defined as an end of the ACK associated with either the MAC-CE or the DCI, as the case may be. If the second option is utilized, the half-duplex wireless communication device 904 may start the clock (e.g., the application time clock) (not shown) and begin counting the application time.

In association with receipt of the semi-persistent SBFD indication or the aperiodic SBFD indication at 906, the half-duplex wireless communication device at 912 may update certain parameters and/or retune various RF and/or baseband parameters according to requirements imposed on the half-duplex wireless communication device 904 associated with a change in bandwidth between the HD and SBFD operations.

At 916, the clock set to count the application time from the start time defined by either option 1 at 908 or option 2 at 912 expires.

At 918, the half-duplex wireless communication device 904 either transmits a first symbol or receives the first symbol following the reconfiguration for the change in bandwidth at 914. According to some aspects, the selection of either the first option or the second option may be pre-configured (e.g., via an original equipment manufacturer (OEM based on one or more standards or specifications).

Figure 10A:
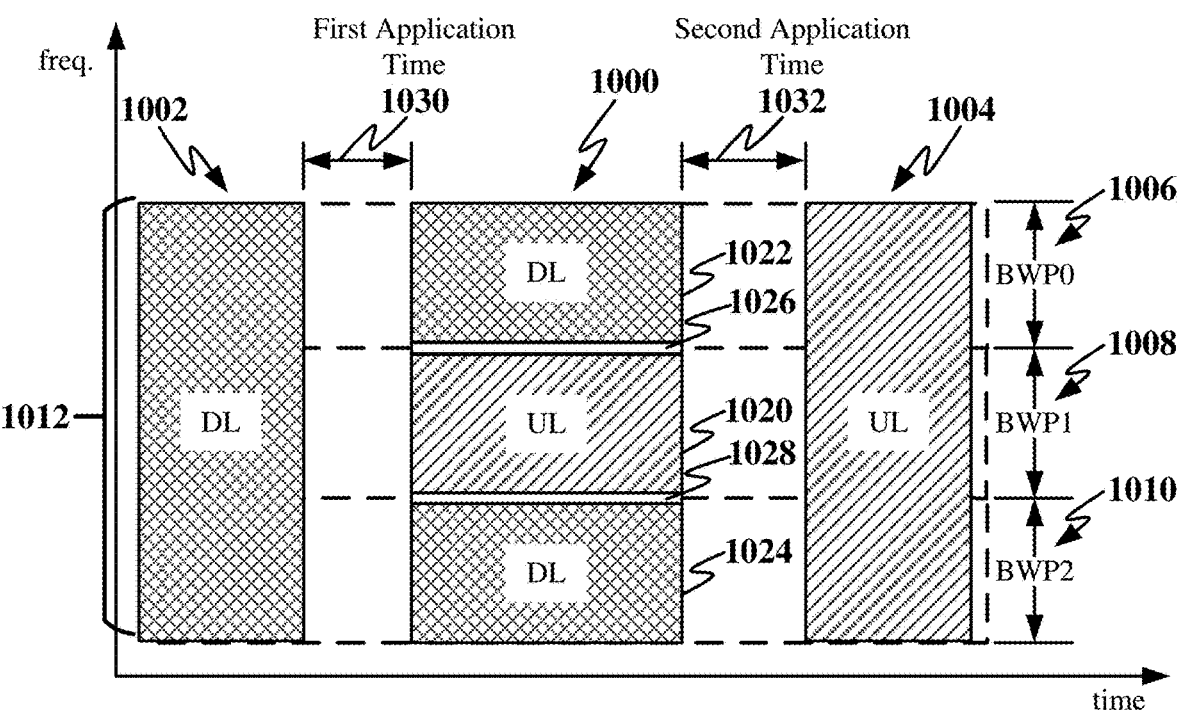
FIGS. 10A and 10B are diagrams illustrating one example of subband full-duplex (SBFD) modulated uplinks and downlinks subdivided according to two bandwidth part (BWP) designation definitions according to some aspects of the disclosure.
Figure 10B:
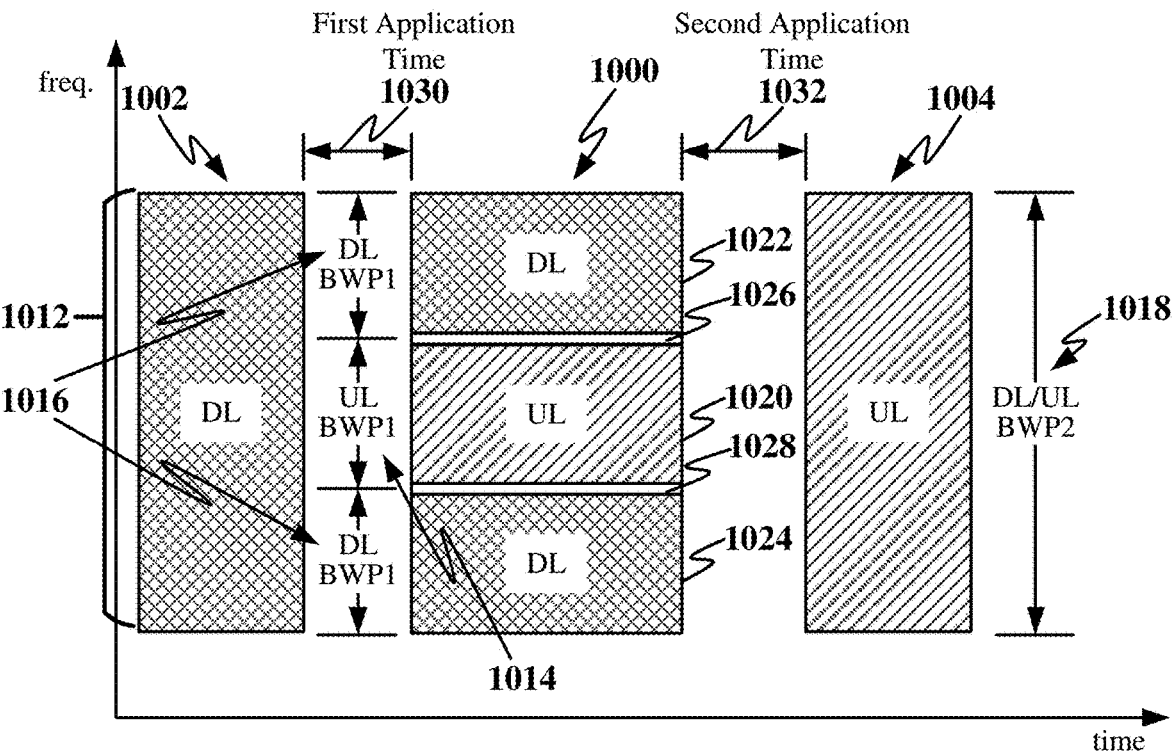

FIGS. 10A and 10B are diagrams illustrating one example of time division multiplexing between HD DL 1002, SBFD 1000, and HD UL 1004. The HD DL 1002 precedes the SBFD 1000 (UL/DL) in the time domain and the HD UL 1004 follows the SBFD 1000 (UL/DL) in the time domain. The SBFD 1000 (UL/DL) does not overlap in time with either the HD DL 1002 or the HD UL 1004. The SBFD 1000 (e.g., UL subband 1020, first DL subband 1022, and second DL subband 1024) are similar to the first example 816 of the UL subband 820, the first DL subband 822, and second DL subband 824 as shown and described in connection with FIG. 8B. Although the example that follows utilizes the SBFD 1000 UL subband 1020, first DL subband 1022, and second DL subband 1024, the example may be extended to the second example 818 of the SBFD UL subband 830 and DL subband 834 as shown and described in connection with FIG. 8B. In fact, all aspects described herein may be applicable to SBFD subbands having two or three different subbands or BWPs within a given carrier bandwidth 1012.

In the examples shown in FIGS. 10A and 10B, time is illustrated along the horizontal axis while frequency is illustrated along the vertical axis. In FIG. 10A, the various modulated uplinks and downlinks are subdivided according to a first bandwidth part (BWP) designation definition. In FIG. 10B, the various modulated uplinks and downlinks are subdivided according to a second bandwidth part (BWP) designation definition.

In FIGS. 10A and 10B, a UL subband 1020 is frequency division multiplexed a first DL subband 1022 and a second DL subband 1024. In the example, the second DL subband 1024 occupies a bandwidth that encompasses frequencies greater than the frequencies occupied by the bandwidth of the UL subband 1020, and the second DL subband 1024 occupies a bandwidth that encompasses frequencies less than the frequencies occupied by the UL subband 1020. An upper guard band 1026 may be interposed between the UL subband 1020 and the first DL subband 1022. A lower guard band 1028 may be interposed between the UL subband 1020 and the second DL subband 1024. The UL subband 1020, first DL subband 1022, and second DL subband 1024 are non-overlapping in frequency.

In FIGS. 10A and 10B, a first application time 1030 and a second application time 1032 are depicted. According to some aspects, the first application time 1030 and the second application time 1032 may be referred to as the first and second switching times. The first application time 1030 may be the time that may be utilized by a half-duplex UE to update certain parameters and/or retune various RF and/or baseband parameters (e.g., adjust –3 dB points of various high pass, low pass, and/or bandpass filters) to switch a transmitter and/or receiver between a first bandwidth (e.g., a first bandwidth that accommodates the HD DL 1002 signal) and a second bandwidth (e.g., the relatively smaller bandwidths of either the UL subband 1020, or the first DL subband 1022 and/or the second DL subband 1024). Conversely, the second application time 1032 may be the time that may be utilized by the half-duplex UE to update certain parameters and/or retune various RF and/or baseband parameters (e.g., adjust –3 dB points of various high pass, low pass, and/or bandpass filters) to switch a transmitter and/or receiver between the second bandwidth and the first bandwidth. The first application time 1030 may be the same, less than, or greater than the second application time 1032.

According to some aspects, rules may be established and/or specific values may be defined to represent the first application time 1030 and the second application time 1032. The rules and/or specific values may be defined to cover various SBFD symbol or slot patterns.

For example, according to some aspects, the values of the first application time 1030 and the second application time 1032 may be pre-configured (e.g., via an original equipment manufacturer (OEM based on one or more standards or specifications). In the example of FIG. 10A, the carrier bandwidth 1012 may be divided into a first BWP 1006 (BWP0), a second BWP 1008 (BWP1), and a third BWP 1010 (BWP2). The BWPs may have unaligned center frequencies. According to one example, the first BWP 1006, the second BWP 1008, and the third BWP 1010 may be equal. According to another example, the first BWP 1006 and the third BWP 1010 may be equal, and may be greater than, equal to, or less than the second BWP 1008. According to another example, the first BWP 1006, the second BWP 1008, and the third BWP 1010 may be unequal. In examples where there are two or more values of bandwidth for two or more BWPs of the SBFD 1000 modulated time-frequency resources, the first application time 1030 and/or the second application time 1032 may be dependent on either a minimum bandwidth or a maximum bandwidth of the two or more BWPs.

According to another aspect, the first application time 1030 and the second application time 1032 may depend on the subcarrier spacing (SCS) of at least one of the first BWP 1006, the second BWP 1008, or the third BWP 1010. In examples where there are two or more values of SCS for two or more BWPs of the SBFD 1000 modulated time-frequency resources, the first application time 1030 and/or the second application time 1032 may be dependent on either a minimum SCS or a maximum SCS of the two or more BWPs.

According to another aspect, the first application time 1030 and/or the second application time 1032 may be configured by a network entity (e.g., a gNB) for a wireless communication device based on a capability of the wireless communication device. For example, the wireless communication device may report its capability to the network entity and the network entity may configure the application time based on the reported capability. The network entity may then transmit the configured application time (e.g., the first application time 1030 and/or the second application time 1032) to the wireless communication device. According to some aspects, the network entity may configure one application time, for example in a circumstance where the first application time 1030 is the same as the second application time 1032, or where only one of the first application time 1030 or the second application time 1032 is updated or otherwise configured.

According to some aspects, the network entity may configure two application times, for example in a circumstance where the first application time 1030 is different from the second application time. The capability may be adjusted, for example, per the sizes of the DL and UL BWPs, per the sizes of the SCSs associated with the DL and UL BWPs, and/or per given pairs of DL and/or UL BWPs and SCSs.

As described above, and as illustrated in FIGS. 10A and 10B, there may be multiple BWPs for HD and/or SBFD symbols and/or slots. In the example of FIG. 10A, the carrier bandwidth 1012 is divided into a set having the first BWP 1006, the second BWP 1008, and the third BWP 1010; the center frequencies of the BWPs are unaligned. In the example of FIG. 10B, in the carrier bandwidth 1012, the SBFD 1000 modulated subbands are divided into a first pair including UL BWP1 1014 and DL BWP1 1016, where DL BWP1 1016 is a non-contiguous DL BWP. The first pair of UL BWP1 1014 and DL BWP1 1016 may have aligned center frequencies. In other words, the center frequency of the contiguous UL BWP1 1014 may be aligned with the center frequency of the non-contiguous DL BWP1 1016. The concept of a pair of BWPs may be expanded to consider a second pair formed by BWP1 (i.e., the combination of UL BWP1 1014 and DL BWP1 1016) and BWP2 (i.e., DL/UL BWP2 1018). In the example of the second pair of BWPs, DL/UL BWP2 1018 is depicted as being equal to the carrier bandwidth 1012; however, in other examples DL/UL BWP2 1018 may not be equal to the carrier bandwidth 1012.

According to the examples of both FIGS. 10A and 10B the first application time 1030 and the second application time 1032 may be established according to set-wise (e.g., FIG. 10A) and pairwise (e.g., FIG. 10B) groupings of BWPs. In connection with set-wise and pair-wise groupings of BWPs, the first application time 1030 and the second application time 1032 may depend on the subcarrier spacing (SCS) of at least one of UL BWP1 1014, DL BWP1 1016, or DL/UL BWP2 1018. In examples where there are two or more values of SCS for two or more BWPs of either the set formed by BWP0 1006, BWP1 1008, and BWP1 1010, the first pair formed by UL BWP1 1014 and DL BWP1, or the second pair formed by BWP1 (i.e., the combination of UL BWP1 1014 and DL BWP1 1016) and BWP2 (i.e., DL/UL BWP2 1018), the first application time 1030 and/or the second application time 1032 may be dependent on either a minimum SCS or a maximum SCS of the given set or pair. According to some aspects, as described above, the first application time 1030 and the second application time 1032 may be the same or different, and may change depending, for example, on whether the change in bandwidth of the transmitter and/or receiver is a change from a first bandwidth associated with a SBFD signal to a second bandwidth associated with a HD signal.

According to another example, a first fixed (e.g., predetermined) value for the first application time 1030 in connection with switching from HD to SBFD and a second fixed value for the second application time 1032 in connection with switching from SBFD to HD (where BWPs are defined as a set (e.g., FIG. 10A) or a pair (e.g., FIG. 10B)) may be established. According to one aspect, a switching delay (e.g., application time) of 8 slots may be referred to as a type 1 BWP switching delay, a switching delay of 18 slots may be referred to as a type 2 BWP switching delay, and a switching delay of, for example, 3 slots may be referred to as a new type (e.g., a type 3 BWP switching delay). The type 3 BWP switching delay may be utilized where the switching delay may be a shorter than that associated with a type 1 or type 2 BWP switching delay. The type 3 BWP switching delay may be a switching delay that may be optimized in connection with instances where, for example, non-BW related parameters associated with a target DL and UL BWP pair/set are unchanged from corresponding non-BW related parameters associated with a source DL and UL BWP pair/set. In such an example, updates to certain parameters and/or retuning of various RF and/or baseband parameters may not be needed. Any of the first application time 1030 or the second application time 1032 may correspond to a type 1, type 2, or type 3 BWP switching delay. As indicated above, the duration of the application time may be defined in connection with switching between a pair of target and source DL and UL BWP sets or DL and UL BWP pairs including HD and SBFD BWPs (i.e., where HD and SBFD DL and UL BWP sets or pairs may each be associated with different BWP switching delay types). According to such an example, an application time may be defined for switching between target and source DL and UL BWPs corresponding to various BWP types.

As a first example, consider switching between a first BWP set and a second BWP set, which may have a switching latency of 18 slots (e.g., type 2) due to different non-BW related baseband parameters (including, e.g., pdcch-config, pdsch-config, sps-config, radioLinkMonitoringConfig, etc.) utilized for the first BWP set (e.g., the source) and the second BWP set (e.g., the target). As a second example, consider switching between a third BWP set and the second BWP set, which may have a switching latency of 3 slots (e.g., type 3) due to the same non-BW related baseband parameters being related to both the third BWP set and the second BWP set. According to the second example, there would be no need to change or tune the non-BW related baseband parameters, thus switching time may be reduced. Thus, the type 3 BWP switching delay (i.e., latency, application time) for the second example, may be associated with shorter (compared to type 1 and type 2) and optimized BWP switching latency.

According to another example, the application time may only depend on the target BWP type (e.g., HD or SBFD BWP set or pair).

According to still another example, the application time may be configured by a network entity (e.g., a gNB) based on a wireless communication device capability per DL/UL BWP and SCS pair for a given source/target BWP type. For example, a wireless communication device may only have a capability of an application time of 18 slots or 8 slots if the source and target BWP sets or pairs are of different types. However, the wireless communication device may have a capability of an application time of 1 or 3 slots if source and target BWP sets or pairs are of the same type (i.e., non-BW baseband parameters have no need to be retuned or changed between source and target BWP sets or pairs).

Figure 11:
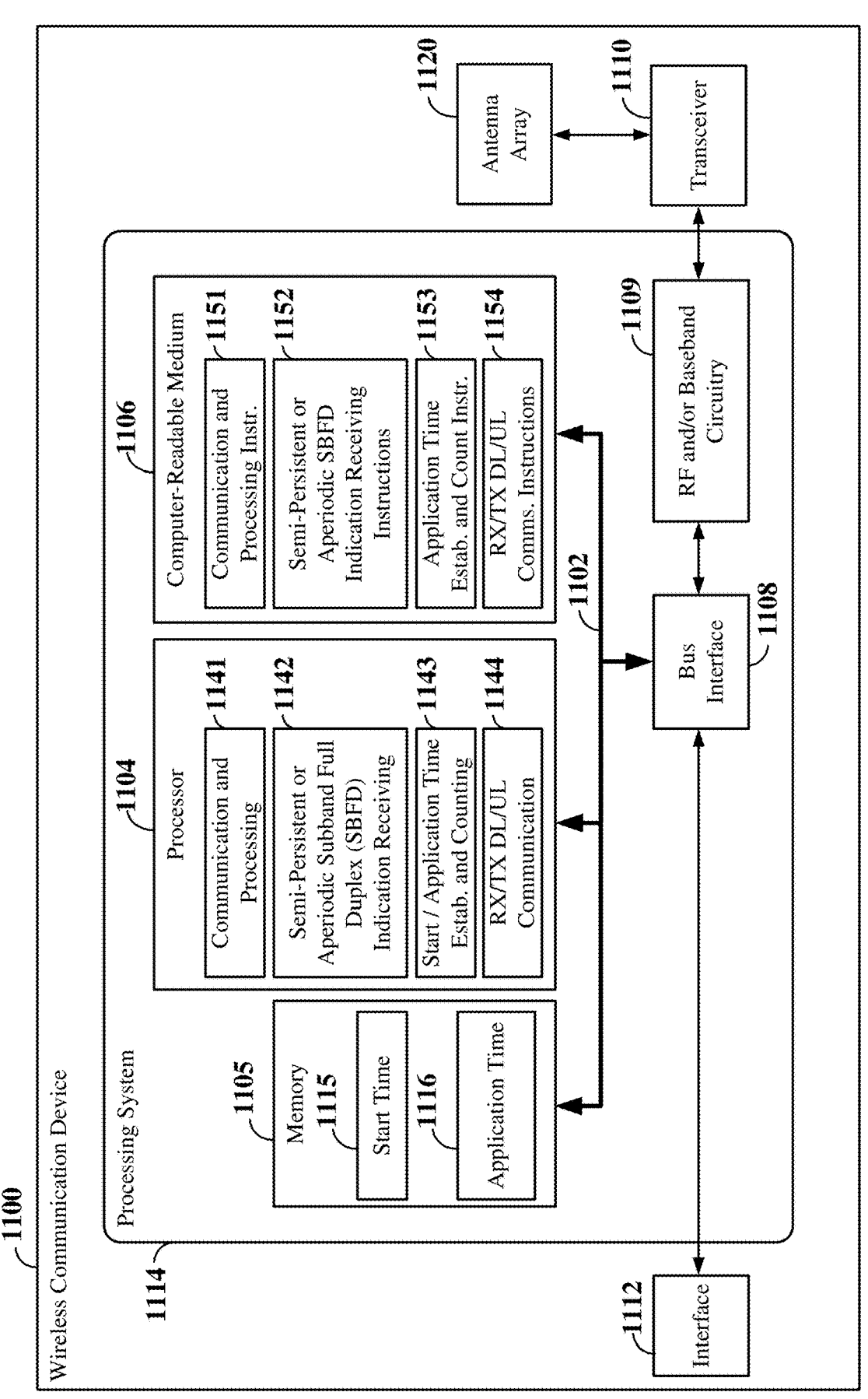
FIG. 11 is a block diagram illustrating an example of a hardware implementation of a wireless communication device employing a processing system according to some aspects of the disclosure.

FIG. 11 is a block diagram illustrating an example of a hardware implementation of a wireless communication device 1100 (e.g., user equipment, a scheduled entity) employing a processing system 1114 according to some aspects. The wireless communication device 1100 may be similar to, for example, any of the wireless communication devices, UEs, or scheduled entities of FIGS. 1, 2, 3, 5, 6, and/or 7.

In accordance with various aspects of the disclosure, an element, or any portion of an element, or any combination of elements may be implemented with a processing system 1114 that includes one or more processors, such as processor 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in the wireless communication device 1100, may be used to implement any one or more of the methods or processes described and illustrated, for example, in FIGS. 9, 10A, 10B, and/or 12.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and RF and/or baseband circuitry 1109 (e.g., low pass, bandpass, high pass filters). The RF and/or baseband circuitry 1109 may be operationally coupled to a transceiver 1110. The transceiver 1110 may be, for example, a wireless transceiver. The transceiver 1110 provides a means for communicating with various other apparatus over a transmission medium (e.g., air interface). The transceiver 1110 may further be coupled to one or more antenna arrays 1120. The transceiver 1110 may be a wireless transceiver. The bus interface 1108 further provides an interface between the bus 1102 and a user interface 1112 (e.g., keypad, display, touch screen, speaker, microphone, control features, etc.). Of course, such a user interface 1112 is optional, and may be omitted in some examples.

One or more processors, such as processor 1104, may be responsible for managing the bus 1102 and general processing, including the execution of software stored on the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1106. The software, when executed by the processor 1104, causes the processing system 1114 to perform the various processes and functions described herein for any particular apparatus.

The computer-readable medium 1106 may be a non-transitory computer-readable medium and may be referred to as a computer-readable storage medium or a non-transitory computer-readable medium. The non-transitory computer-readable medium may store computer-executable code (e.g., processor-executable code). The computer executable code may include code for causing a computer (e.g., a processor) to implement one or more of the functions described herein. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product or article of manufacture. By way of example, a computer program product or article of manufacture may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system. The computer-readable medium 1106 and/or the memory 1105 may also be used for storing data that is manipulated by the processor 1104 when executing software. For example, the memory 1105 may store a start time memory location 1115 and an application time memory location 1116.

In some aspects of the disclosure, the processor 1104 may include communication and processing circuitry 1141 configured for various functions, including for example communicating with a network entity (e.g., a gNB, a base station, a scheduled entity), a network core (e.g., a 5G core network), and another wireless communication device (e.g., a UE, a scheduled entity), or any other entity, such as, for example, local infrastructure or an entity communicating with the wireless communication device 1100 via the Internet, such as a network provider. In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1141 may be configured to receive a configuration corresponding to multiple bandwidth parts (BWPs) associated with a half-duplex pattern and an SBFD pattern, the configuration based on a capability of the wireless communication device per DL/UL BWP-subcarrier spacing pair and for a given source or target BWP type. The communication and processing circuitry 1141 may further be configured to execute communication and processing instructions 1151 (e.g., software) stored on the computer-readable medium 1106 to implement one or more functions described herein.

In some aspects of the disclosure, the processor 1104 may include semi-persistent subband full-duplex (SBFD) indication or aperiodic SBFD indication receiving circuitry 1142 configured for various functions, including, for example, receiving at least one of a semi-persistent SBFD indication or an aperiodic SBFD indication. The semi-persistent SBFD indication or the aperiodic SBFD indication may be received from a network entity (e.g., a gNB, a base station, a scheduling entity). According to some examples, the application time may be dependent on a first subcarrier spacing associated with a downlink communication and a second subcarrier spacing associated with an uplink communication. According to some examples, the application time may be associated with a switch between a half-duplex pattern and an SBFD pattern. The application time may be fixed. According to some examples, the application time may be dependent on subcarrier spacings of the plurality of downlink and uplink subbands of the SBFD communications. According to some aspects, the application time may be associated with a switch between a half-duplex pattern and an SBFD pattern and is at least one of: defined in connection with switching between a target BWP type and a source BWP type or is dependent on the target BWP type. According to some aspects, the application time may be associated with a change in bandwidth between a half-duplex pattern and a SBFD pattern and may be dependent upon whether values of non-BWP related baseband parameters change in response to a switch between the half-duplex pattern and the SBFD pattern. In some examples, the values of non-BWP related RF and/or baseband parameters may be changed in the RF and/or baseband circuitry 1109.

According to some aspects, an SBFD pattern may include a plurality of subbands, each of the plurality of subbands having a different center frequency. An application time may be configured to the wireless communication device by a network entity (e.g., a gNB). The wireless communication device may report its capability to the network entity. The network entity may configure the wireless communication device with a certain application time based on the wireless communication device's capability. According to some examples, the wireless communication device may receive a configuration allocating the application time. The configuration may be based on a capability of the wireless communication device. In some examples, the capability may be determined on per DL/UL BWP-subcarrier spacing pair basis. The semi-persistent SBFD indication or aperiodic SBFD indication receiving circuitry 1142 may further be configured to execute semi-persistent SBFD indication or aperiodic SBFD indication receiving instructions 1152 (e.g., software) stored on the computer-readable medium 1106 to implement one or more functions described herein.

In some aspects of the disclosure, the processor 1104 may include start time/application time establishment and counting circuitry 1143 configured for various functions, including, for example, receiving a downlink symbol or transmitting an uplink symbol following expiration of an application time counted from a start time associated with the at least one of the semi-persistent SBFD indication or the aperiodic SBFD indication. The start time may be stored, for example, in a start time memory location 1115 in the memory 1105 of the wireless communication device 1100. The application time may be stored, for example, in an application time memory location 1116 in the memory 1105 of the wireless communication device 1100.

In some aspects the start time/application time establishment and counting circuitry 1143 may further be configured obtain the start time. In some examples the start time may coincide with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, or an end of a first acknowledgment (ACK) associated with the MAC-CE, or an end of a second ACK associated with the DCI. In some examples, an SBFD pattern corresponding to a non-contiguous downlink bandwidth part (BWP) and an uplink BWP is a fixed pattern, and center frequencies of the non-contiguous downlink bandwidth part (BWP) and an uplink BWP are aligned. The start time/application time establishment and counting circuitry 1143 may further be configured to execute start time/application time establishment and counting instructions 1153 (e.g., software) stored on the computer-readable medium 1106 to implement one or more functions described herein.

In some aspects of the disclosure, the processor 1104 may include receiving (RX)/transmitting (TX) downlink (DL) or uplink (UL), respectively, communication circuitry 1144 configured for various functions, including, for example, receiving or transmitting a downlink communication or an uplink communication, respectively, according to an SBFD pattern, in configured downlink/uplink (DL/UL) bandwidth parts (BWPs) following expiration of the application time counted from the start time. The RX/TX DL/UL communication circuitry 1144 may further be configured to execute RX/TX DL/UL communication instructions 1154 (e.g., software) stored on the computer-readable medium 1106 to implement one or more functions described herein.

FIG. 12 is a flow chart illustrating an example process 1200 (e.g., a method) of wireless communication, in a wireless communication network, at a wireless communication device in accordance with some aspects of the disclosure. As described below, some or all illustrated features may be omitted in a particular implementation within the scope of the present disclosure, and some illustrated features may not be required for implementation of all embodiments. In some examples, the process 1200 may be carried out by the wireless communication device 1100 as illustrated and described in connection with FIG. 11. The wireless communication device 1100 may be similar to, for example, any of the wireless communication devices, UEs, or scheduled entities of FIGS. 1, 2, 3, 5, 6, 9, and/or 11. In some examples, the process 1200 may be carried out by any suitable apparatus or means for carrying out the functions or algorithm described below.

At block 1202, the wireless communication device may receive at least one of a semi-persistent subband full-duplex (SBFD) indication or an aperiodic SBFD indication. For example, the semi-persistent of aperiodic SBFD indication receiving circuitry 1142 shown and described above in connection with FIG. 11 may provide a means to receive at least one of a semi-persistent subband full-duplex (SBFD) indication or an aperiodic SBFD indication.

At block 1204, the wireless communication device may receive a downlink symbol or transmit an uplink symbol in a half-duplex mode following expiration of an application time counted from a start time associated with the at least one of the semi-persistent SBFD indication or the aperiodic SBFD indication. For example, the start/application time establishment and counting circuitry 1143 shown and described in connection with FIG. 11 may provide a means for receiving a downlink symbol or transmitting an uplink symbol following expiration of an application time counted from a start time associated with the at least one of the semi-persistent SBFD indication or the aperiodic SBFD indication. According to some aspects, the start time may coincide with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, or an end of a first acknowledgment (ACK) associated with the MAC-CE, or an end of a second ACK associated with the DCI. According to some aspects, the application time may be dependent on a first subcarrier spacing associated with a downlink communication and a second subcarrier spacing associated with an uplink communication. According to some aspects, the application time may be associated with a switch between a half-duplex pattern and an SBFD pattern.

The application time may be fixed. In some examples the application time may be configured to the wireless communication device by a network entity (e.g., a gNB, a scheduling entity). In one example, the wireless communication device may report its capability to the network entity. The network entity may decide on and configure the wireless communication device with a certain application time (e.g., based on the reported capability of the wireless communication device).

At block 1206, the wireless communication device may optionally receive or transmit a downlink communication or an uplink communication, respectively, according to an SBFD pattern, in configured downlink/uplink (DL/UL) bandwidth parts (BWPs), following an expiration of the application time counted from the start time. For example, the RX/TX DL/UL communication circuitry 1144 shown and described in connection with FIG. 11 may provide a means for receiving or transmitting a downlink communication or an uplink communication, respectively, according to an SBFD pattern, in configured downlink/uplink (DL/UL) bandwidth parts (BWPs), following an expiration of the application time counted from the start time. In some examples, an SBFD pattern corresponding to a non-contiguous downlink bandwidth part (BWP) and an uplink BWP may be a fixed pattern, and center frequencies of the non-contiguous downlink bandwidth part (BWP) and the uplink BWP may be aligned. In some examples, the wireless communication device may receive a configuration allocating the application time, the configuration based on a capability of the wireless communication device per DL/UL BWP-subcarrier spacing pair. In some examples, the wireless communication device may receive a configuration corresponding to multiple bandwidth parts (BWPs) associated with a half-duplex pattern and an SBFD pattern. The configuration may be based on a capability of the wireless communication device per DL/UL BWP-subcarrier spacing pair and for a given source or target BWP type.

Figure 13:
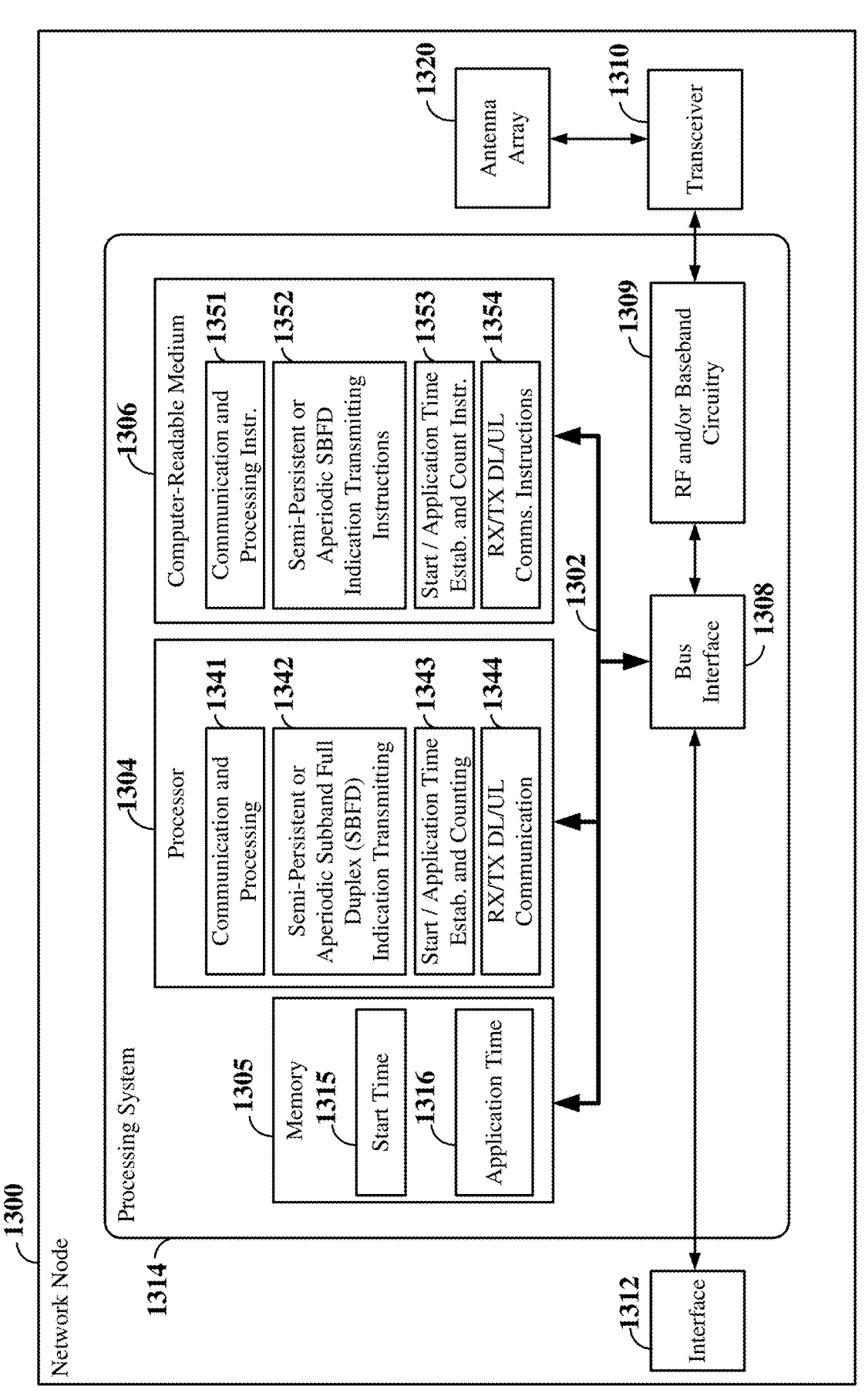
FIG. 13 is a block diagram illustrating an example of a hardware implementation of a network entity employing a processing system according to some aspects of the disclosure.

FIG. 13 is a block diagram illustrating an example of a hardware implementation of a network entity 1300 (e.g., a gNB, a base station, a scheduling entity) employing a processing system 1314 according to some aspects. The network entity 1300 may be similar to, for example, any of the network entities or scheduling entities of FIGS. 1, 2, 3, 5, 6, 7, and/or 9.

The processing system 1314 may be substantially the same as the processing system 1114 illustrated in FIG. 11, including a bus interface 1308, RF and/or baseband circuitry 1309, a bus 1302, memory 1305, a processor 1304, and a computer-readable medium 1306. In accordance with various aspects of the disclosure, an element, or any portion of an element, or any combination of elements may be implemented with a processing system 1314 that includes one or more processors, such as processor 1304. Furthermore, the network entity 1300 may include a user interface 1312, a transceiver 1310, and one or more antenna arrays 1320 substantially similar to those described above in FIG. 11. The transceiver 1310 may be, for example, a wireless transceiver. The processor 1304, as utilized in a network entity 1300, may be used to implement any one or more of the processes described herein and illustrated, for example, in FIGS. 9, 10, and/or 14.

In some aspects of the disclosure, the processor 1304 may include communication and processing circuitry 1341 configured for various functions, including for example communicating with a wireless communication device (e.g., a UE), a network core (e.g., a 5G core network), and another network entity (e.g., a gNB, a base station, a scheduling entity), or any other entity, such as, for example, local infrastructure or an entity communicating with the network entity 1300 via the Internet, such as a network provider. In some examples, the communication and processing circuitry 1341 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 1341 may be configured to transmit a configuration corresponding to multiple bandwidth parts (BWPs) associated with a half-duplex pattern and an SBFD pattern, the configuration based on a capability of a wireless communication device per DL/UL BWP-subcarrier spacing pair and for a given source or target BWP type. The communication and processing circuitry 1341 may further be configured to execute communication and processing instructions 1351 (e.g., software) stored on the computer-readable medium 1306 to implement one or more functions described herein.

In some aspects of the disclosure, the processor 1304 may include semi-persistent subband full-duplex (SBFD) indication or aperiodic SBFD indication transmitting circuitry 1342 configured for various functions, including, for example, transmitting at least one of a semi-persistent SBFD indication or an aperiodic SBFD indication. The semi-persistent SBFD indication or the aperiodic SBFD indication may be transmitted to a wireless communication device (e.g., a UE, a scheduled entity). According to some examples, the application time may be dependent on a first subcarrier spacing associated with a downlink communication and a second subcarrier spacing associated with an uplink communication. According to some examples, the application time may be associated with a switch between a half-duplex pattern and an SBFD pattern. The application time may be fixed. According to some examples, the application time may be dependent on subcarrier spacings of the plurality of downlink and uplink subbands of the SBFD communications. According to some aspects, the application time may be associated with a switch between a half-duplex pattern and an SBFD pattern and is at least one of: defined in connection with switching between a target BWP type and a source BWP type or is dependent on the target BWP type. According to some aspects, the application time may be associated with a change in bandwidth between a half-duplex pattern and a SBFD pattern and may be dependent upon whether values of non-BWP related baseband parameters change in response to a switch between the half-duplex pattern and the SBFD pattern. In some examples, the values of non-BWP related baseband parameters may be changed in the RF and/or baseband circuitry 1309.

According to some aspects, an SBFD pattern may include a plurality of subbands, each of the plurality of subbands having a different center frequency. An application time may be configured to a wireless communication device by the network entity. The wireless communication device may report its capability to the network entity. The network entity may configure the wireless communication device with a certain application time based on the wireless communication device's capability. According to some examples, the network entity may transmit, and the wireless communication device may receive, a configuration allocating the application time. The configuration may be based on a capability of the wireless communication device. In some examples, the capability may be determined on per DL/UL BWP-subcarrier spacing pair basis. The semi-persistent SBFD indication or aperiodic SBFD indication transmitting circuitry 1342 may further be configured to execute semi-persistent SBFD indication or aperiodic SBFD indication receiving instructions 1352 (e.g., software) stored on the computer-readable medium 1306 to implement one or more functions described herein.

In some aspects of the disclosure, the processor 1304 may include start time/application time establishment and counting circuitry 1343 configured for various functions, including, for example, transmitting a downlink symbol or receiving an uplink symbol following expiration of an application time counted from a start time associated with the at least one of the semi-persistent SBFD indication or the aperiodic SBFD indication. The start time may be stored, for example, in a start time memory location 1315 in the memory 1305 of the network entity 1300. The application time may be stored, for example, in an application time memory location 1316 in the memory 1305 of the network entity 1300.

In some aspects the start time/application time establishment and counting circuitry 1343 may further be configured obtain the start time. In some examples the start time may coincide with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, or an end of a first acknowledgment (ACK) associated with the MAC-CE, or an end of a second ACK associated with the DCI. In some examples, an SBFD pattern corresponding to a non-contiguous downlink bandwidth part (BWP) and an uplink BWP is a fixed pattern, and center frequencies of the non-contiguous downlink bandwidth part (BWP) and an uplink BWP are aligned. The start time/application time establishment and counting circuitry 1343 may further be configured to execute start time/application time establishment and counting instructions 1353 (e.g., software) stored on the computer-readable medium 1306 to implement one or more functions described herein.

In some aspects of the disclosure, the processor 1304 may include receiving (RX)/transmitting (TX) downlink (DL) or uplink (UL), respectively, communication circuitry 1344 configured for various functions, including, for example, receiving or transmitting an uplink communication or a downlink communication, respectively, according to an SBFD pattern, in configured downlink/uplink (DL/UL) bandwidth parts (BWPs) following expiration of the application time counted from the start time. The RX/TX DL/UL communication circuitry 1344 may further be configured to execute RX/TX DL/UL communication instructions 1354 (e.g., software) stored on the computer-readable medium 1306 to implement one or more functions described herein.

FIG. 14 is a flow chart illustrating an example process 1400 (e.g., a method) of wireless communication, in a wireless communication network, at a network entity in accordance with some aspects of the disclosure. As described below, some or all illustrated features may be omitted in a particular implementation within the scope of the present disclosure, and some illustrated features may not be required for implementation of all embodiments. In some examples, the process 1400 may be carried out by the network entity 1300 as illustrated and described in connection with FIG. 13. The network entity 1300 may be similar to, for example, any of the network entities, gNBs, or scheduling entities of FIGS. 1, 2, 3, 5, 6, 9, and/or 13. In some examples, the process 1400 may be carried out by any suitable apparatus or means for carrying out the functions or algorithm described below.

At block 1402, the network entity may transmit at least one of a semi-persistent subband full-duplex (SBFD) indication or an aperiodic SBFD indication. For example, the semi-persistent of aperiodic SBFD indication transmitting circuitry 1342 shown and described above in connection with FIG. 13 may provide a means to transmit at least one of a semi-persistent subband full-duplex (SBFD) indication or an aperiodic SBFD indication.

At block 1404, the network entity may transmit a downlink symbol and receive an uplink symbol in an SBFD mode following expiration of an application time counted from a start time associated with the at least one of the semi-persistent SBFD indication or the aperiodic SBFD indication. For example, the start/application time establishment and counting circuitry 1343 shown and described in connection with FIG. 13 may provide a means for transmitting a downlink symbol or receiving an uplink symbol following expiration of an application time counted from a start time associated with the at least one of the semi-persistent SBFD indication or the aperiodic SBFD indication. According to some aspects, the start time may coincide with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, or an end of a first acknowledgment (ACK) associated with the MAC-CE, or an end of a second ACK associated with the DCI. According to some aspects, the application time may be dependent on a first subcarrier spacing associated with a downlink communication and a second subcarrier spacing associated with an uplink communication. According to some aspects, the application time may be associated with a switch between a half-duplex pattern and an SBFD pattern. The application time may be fixed. In some examples the application time may be configured to a wireless communication device by the network entity. In one example, the wireless communication device may report its capability to the network entity. The network entity may decide on and configure the wireless communication device with a certain application time (e.g., based on the reported capability of the wireless communication device).

At block 1406, the network entity may receive and transmit an uplink communication and a downlink communication, respectively, according to an SBFD pattern, in configured downlink/uplink (DL/UL) bandwidth parts (BWPs), following an expiration of the application time counted from the start time. For example, the RX/TX DL/UL communication circuitry 1344 shown and described in connection with FIG. 13 may provide a means for receiving or transmitting an uplink communication or a downlink communication, respectively, according to an SBFD pattern, in configured downlink/uplink (DL/UL) bandwidth parts (BWPs), following an expiration of the application time counted from the start time. In some examples, an SBFD pattern corresponding to a non-contiguous downlink bandwidth part (BWP) and an uplink BWP may be a fixed pattern, and center frequencies of the non-contiguous downlink bandwidth part (BWP) and the uplink BWP may be aligned. In some examples, the network entity may transmit a configuration allocating the application time, the configuration based on a capability of a wireless communication device per DL/UL BWP-subcarrier spacing pair. In some examples, the network entity may transmit a configuration corresponding to multiple bandwidth parts (BWPs) associated with a half-duplex pattern and an SBFD pattern. The configuration may be based on a capability of the wireless communication device per DL/UL BWP-subcarrier spacing pair and for a given source or target BWP type.

Of course, in the above examples, the circuitry included in the processor 1104 of FIG. 11 and/or the processor 1304 of FIG. 13 is merely provided as an example. Other means for carrying out the described processes or functions may be included within various aspects of the present disclosure, including but not limited to the instructions stored in the computer-readable medium 1106 of FIG. 11 and/or the computer-readable medium 1306 of FIG. 13, or any other suitable apparatus or means described in any one of the FIGS. 1, 2, 3, 5, 6, 7, 9, 11, and/or 13 and utilizing, for example, the processes and/or algorithms described herein in relation to FIGS. 9, 12, and/or 14.

The following provides an overview of aspects of the present disclosure:

Aspect 1: A wireless communication device, comprising: a memory; and a processor coupled to the memory, the processor being configured to: receive at least one of a semi-persistent subband full-duplex (SBFD) indication or an aperiodic SBFD indication, and receive a downlink symbol or transmit an uplink symbol in a half-duplex mode following expiration of an application time counted from a start time associated with the at least one of the semi-persistent SBFD indication or the aperiodic SBFD indication.

Aspect 2: The wireless communication device of aspect 1, wherein the start time coincides with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, an end of a first acknowledgment (ACK) associated with the MAC-CE, or an end of a second ACK associated with the DCI.

Aspect 3: The wireless communication device of aspect 1 or 2, wherein the processor is further configured to: receive or transmit a downlink communication or an uplink communication, respectively, according to an SBFD pattern, in configured downlink/uplink (DL/UL) bandwidth parts (BWPs) following an expiration of the application time counted from the start time.

Aspect 4: The wireless communication device of any of aspects 1 through 3, wherein an SBFD pattern corresponding to a non-contiguous downlink bandwidth part (BWP) and an uplink BWP is a fixed pattern, and center frequencies of the non-contiguous downlink bandwidth part (BWP) and the uplink BWP are aligned.

Aspect 5: The wireless communication device of any of aspects 1 through 4, wherein the application time is dependent on a first subcarrier spacing associated with a downlink communication and a second subcarrier spacing associated with an uplink communication.

Aspect 6: The wireless communication device of any of aspects 1 through 5, wherein the processor is further configured to: receive a configuration allocating the application time, the configuration based on a capability of the wireless communication device per DL/UL BWP-subcarrier spacing pair.

Aspect 7: The wireless communication device of any of aspects 1 through 6, wherein the application time is associated with a switch between a half-duplex pattern and an SBFD pattern, and the application time is fixed.

Aspect 8: The wireless communication device of any of aspects 1 through 7, wherein: an SBFD pattern is comprised of a plurality of subbands, each of the plurality of subbands having a different center frequency.

Aspect 9: The wireless communication device of any of aspects 1 through 8, wherein the application time is associated with a change in bandwidth between a half-duplex pattern and a SBFD pattern and is dependent upon whether values of non-BWP related baseband parameters change in response to a switch between the half-duplex pattern and the SBFD pattern.

Aspect 10: The wireless communication device of any of aspects 1 through 9, wherein the application time is associated with a switch between a half-duplex pattern and an SBFD pattern, and is at least one of: defined in connection with switching between a target BWP switching delay type and a source BWP switching delay type, or is dependent on the target BWP switching delay type.

Aspect 11: The wireless communication device of any of aspects 1 through 10, wherein the processor is further configured to: receive a configuration corresponding to multiple bandwidth parts (BWPs) associated with a half-duplex pattern and an SBFD pattern, the configuration based on a capability of the wireless communication device per DL/UL BWP-subcarrier spacing pair and for a given source or target BWP type.

Aspect 12: A method of wireless communication at a wireless communication device, comprising: receiving at least one of a semi-persistent subband full-duplex (SBFD) indication or an aperiodic SBFD indication, and receiving a downlink symbol or transmitting an uplink symbol in a half-duplex mode following an expiration of an application time counted from a start time associated with the at least one of the semi-persistent SBFD indication or the aperiodic SBFD indication.

Aspect 13: The method of aspect 12, wherein the start time coincides with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, an end of a first acknowledgment (ACK) associated with the MAC-CE, or an end of a second ACK associated with the DCI.

Aspect 14: The method of aspect 12 or 13, further comprising: receiving or transmitting a downlink communication or an uplink communication, respectively, according to an SBFD pattern, in configured downlink/uplink (DL/UL) bandwidth parts (BWPs) following the expiration of the application time counted from the start time.

Aspect 15: The method of aspect 12, wherein an SBFD pattern corresponding to a non-contiguous downlink bandwidth part (BWP) and an uplink BWP is a fixed pattern, and center frequencies of the non-contiguous downlink bandwidth part (BWP) and the uplink BWP are aligned.

Aspect 16: The method of any of aspects 12 through 15, wherein the application time is dependent on a first subcarrier spacing associated with a downlink communication and a second subcarrier spacing associated with an uplink communication.

Aspect 17: The method of any of aspects 12 through 16, further comprising: receiving a configuration allocating the application time, the configuration based on a capability of the wireless communication device per DL/UL BWP-subcarrier spacing pair.

Aspect 18: The method of any of aspects 12 through 17, wherein the application time is associated with a switch between a half-duplex pattern and an SBFD pattern, and the application time is fixed.

Aspect 19: The method of any of aspects 12 through 18, further comprising: receiving a configuration corresponding to multiple bandwidth parts (BWPs) associated with a half-duplex pattern and an SBFD pattern, the configuration based on a capability of the wireless communication device per DL/UL BWP-subcarrier spacing pair and for a given source or target BWP type.

Aspect 20: A network entity, comprising: a memory; and a processor coupled to the memory, the processor being configured to: transmit at least one of a semi-persistent subband full-duplex (SBFD) indication or an aperiodic SBFD indication, and receive an uplink symbol and transmit a downlink symbol in an SBFD mode following expiration of an application time counted from a start time associated with the at least one of the semi-persistent SBFD indication or the aperiodic SBFD indication.

Aspect 21: The network entity of aspect 20, wherein the start time coincides with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, an end of a first acknowledgment (ACK) associated with the MAC-CE, or an end of a second ACK associated with the DCI.

Aspect 22: The network entity of aspect 20 or 21, wherein the processor is further configured to: receive and transmit an uplink communication and a downlink communication, respectively, according to an SBFD pattern, in configured downlink/uplink (DL/UL) bandwidth parts (BWPs) following an expiration of the application time counted from the start time.

Aspect 23: The network entity of any of aspects 20 through 22, wherein an SBFD pattern corresponding to a non-contiguous downlink bandwidth part (BWP) and an uplink BWP is a fixed pattern, and center frequencies of the non-contiguous downlink bandwidth part (BWP) and the uplink BWP are aligned.

Aspect 24: The network entity of any of aspects 20 through 23, wherein the application time is dependent on a first subcarrier spacing associated with a downlink communication and a second subcarrier spacing associated with an uplink communication.

Aspect 25: The network entity of any of aspects 20 through 24, wherein the processor is further configured to: transmit a configuration allocating the application time, the configuration based on a capability of a wireless communication device per DL/UL BWP-subcarrier spacing pair.

Aspect 26: The network entity of any of aspects 20 through 25, wherein the application time is associated with a switch between a half-duplex pattern and an SBFD pattern, and the application time is fixed.

Aspect 27: The network entity of any of aspects 20 through 26, wherein: an SBFD pattern is comprised of a plurality of subbands, each of the plurality of subbands having a different center frequency.

Aspect 28: The network entity of any of aspects 20 through 27, wherein the application time is associated with a change in bandwidth between a half-duplex pattern and a SBFD pattern and is dependent upon whether values of non-BWP related baseband parameters change in response to a switch between the half-duplex pattern and the SBFD pattern.

Aspect 29: The network entity of any of aspects 20 through 28, wherein the application time is associated with a switch between a half-duplex pattern and an SBFD pattern, and is at least one of: defined in connection with switching between a target BWP type and a source BWP type, or is dependent on the target BWP type.

Aspect 30: The network entity of any of aspects 20 through 29, wherein the processor is further configured to: transmit a configuration corresponding to multiple bandwidth parts (BWPs) associated with a half-duplex pattern and an SBFD pattern, the configuration based on a capability of a wireless communication device per DL/UL BWP-subcarrier spacing pair and for a given source or target BWP type.

Aspect 31: A method of wireless communication at a network entity, comprising: transmitting at least one of a semi-persistent subband full-duplex (SBFD) indication or an aperiodic SBFD indication, and receiving an uplink symbol and transmitting a downlink symbol in an SBFD mode following expiration of an application time counted from a start time associated with the at least one of the semi-persistent SBFD indication or the aperiodic SBFD indication.

Aspect 32: The method of aspect 31, wherein the start time coincides with at least one of: an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, an end of a first acknowledgment (ACK) associated with the MAC-CE, or an end of a second ACK associated with the DCI.

Aspect 33: The method of aspect 31 or 32, further comprising: receiving or transmitting an uplink communication or a downlink communication, respectively, according to an SBFD pattern, in configured downlink/uplink (DL/UL) bandwidth parts (BWPs) following an expiration of the application time counted from the start time.

Aspect 34: The method of any of aspects 31 through 33, wherein an SBFD pattern corresponding to a non-contiguous downlink bandwidth part (BWP) and an uplink BWP is a fixed pattern, and center frequencies of the non-contiguous downlink bandwidth part (BWP) and the uplink BWP are aligned.

Aspect 35: The method of any of aspects 31 through 34, wherein the application time is dependent on a first subcarrier spacing associated with a downlink communication and a second subcarrier spacing associated with an uplink communication.

Aspect 36: The method of any of aspects 31 through 35, wherein the processor is further configured to: transmit a configuration allocating the application time, the configuration based on a capability of a wireless communication device per DL/UL BWP-subcarrier spacing pair.

Aspect 37: The method of any of aspects 31 through 36, wherein the application time is associated with a switch between a half-duplex pattern and an SBFD pattern, and the application time is fixed.

Aspect 38: The method of any of aspects 31 through 37, wherein: an SBFD pattern is comprised of a plurality of subbands, each of the plurality of subbands having a different center frequency.

Aspect 39: The method of any of aspects 31 through 38, wherein the application time is associated with a change in bandwidth between a half-duplex pattern and a SBFD pattern and is dependent upon whether values of non-BWP related baseband parameters change in response to a switch between the half-duplex pattern and the SBFD pattern.

Aspect 40: The method of any of aspects 31 through 39, wherein the application time is associated with a switch between a half-duplex pattern and an SBFD pattern, and is at least one of: defined in connection with switching between a target BWP type and a source BWP type, or is dependent on the target BWP type.

Aspect 41: The method of any of aspects 31 through 40, further comprising: transmitting a configuration corresponding to multiple bandwidth parts (BWPs) associated with a half-duplex pattern and an SBFD pattern, the configuration based on a capability of a wireless communication device per DL/UL BWP-subcarrier spacing pair and for a given source or target BWP type.

Aspect 42: An apparatus configured for wireless communication comprising at least one means for performing a method of any one of aspects 12 through 19 or 31 through 41.

Aspect 43: A non-transitory computer-readable medium storing computer-executable code, comprising code for causing an apparatus to perform a method of any one of aspects 12 through 19 or 31 through 41.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of functions described in the present disclosure.

One or more of the components, steps, features and/or functions illustrated in FIGS. 1-14 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein. While some examples illustrated herein depict only time and frequency domains, additional domains such as a spatial domain are also contemplated in this disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct A and/or B is intended to cover: A; B; and A and B. The word "obtain" as used herein may mean, for example, acquire, calculate, construct, derive, determine, receive, and/or retrieve. The preceding list is exemplary and not limiting. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A wireless communication device, comprising:
one or more memories; and
one or more processors coupled to the one or more memories, the one or more processors being configured to:
  receive, at the wireless communication device, at least one of a semi-persistent subband full-duplex (SBFD) indication or an aperiodic SBFD indication;
  reconfigure the wireless communication device between a half-duplex mode and an SBFD mode, or vice versa, prior to an expiration of an application time counted from a start time associated with the receiving of the at least one of the semi-persistent SBFD indication or the aperiodic SBFD indication; and
  receive a downlink symbol at, or transmit an uplink symbol from, the wireless communication device following the expiration of the application time,
  wherein the application time is associated with a switch between a half-duplex pattern and an SBFD pattern, and is at least one of:
    defined in connection with switching between a target bandwidth part (BWP) switching delay type and a source BWP switching delay type, or
    is dependent on the target BWP switching delay type.

2. The wireless communication device of claim 1, wherein the start time coincides with at least one of:
an end of a medium access control-control element (MAC-CE) carrying the at least one of the semi-persistent or the aperiodic SBFD indication,
an end of a radio resource control (RRC) cell common indication carrying the at least one of the semi-persistent or the aperiodic SBFD indication,
an end of a downlink control information (DCI) carrying the at least one of the semi-persistent or the aperiodic SBFD indication,
an end of a first acknowledgment (ACK) associated with the MAC-CE, or
an end of a second ACK associated with the DCI.

3. The wireless communication device of claim 1, wherein the one or more processors are further configured to:
receive or transmit a downlink communication or an uplink communication, respectively, according to the SBFD pattern, in configured downlink/uplink (DL/UL) bandwidth parts (BWPs) following the expiration of the application time counted from the start time.

4. The wireless communication device of claim 1, wherein the SBFD pattern corresponding to a non-contiguous downlink bandwidth part (BWP) and an uplink BWP is a fixed pattern, and center frequencies of the non-contiguous downlink BWP and the uplink BWP are aligned.

5. The wireless communication device of claim 1, wherein the application time is dependent on a first subcarrier spacing associated with a downlink communication and a second subcarrier spacing associated with an uplink communication.

6. The wireless communication device of claim 1, wherein the one or more processors are further configured to:
receive a configuration allocating the application time, the configuration based on a capability of the wireless communication device per downlink/uplink bandwidth part (DL/UL BWP)-subcarrier spacing pair.

7. The wireless communication device of claim 1, wherein the application time is associated with the switch between the half-duplex pattern and the SBFD pattern, and the application time is fixed.

8. The wireless communication device of claim 1, wherein:
the SBFD pattern is comprised of a plurality of subbands, each of the plurality of subbands having a different center frequency.

9. The wireless communication device of claim 1, wherein the application time is associated with a change in bandwidth associated with the switch between the half-duplex pattern and the SBFD pattern and is dependent upon whether values of non-bandwidth part (non-BWP) related baseband parameters change in response to the switch between the half-duplex pattern and the SBFD pattern.

10. The wireless communication device of claim 1, wherein the one or more processors are further configured to:
receive a configuration corresponding to multiple bandwidth parts (BWPs) associated with the half-duplex pattern and the SBFD pattern, the configuration based on a capability of the wireless communication device per downlink/uplink bandwidth part (DL/UL BWP)-subcarrier spacing pair and for a given source or target BWP type.

11. A method of wireless communication at a wireless communication device, comprising:
receiving, at the wireless communication device, at least one of a semi-persistent subband full-duplex (SBFD) indication or an aperiodic SBFD indication;
reconfiguring the wireless communication device between a half-duplex mode and an SBFD mode, or vice versa, prior to an expiration of an application time counted from a start time associated with the receiving of the at least one of the semi-persistent SBFD indication or the aperiodic SBFD indication; and
receiving a downlink symbol at, or transmitting an uplink symbol from, the wireless communication device following the expiration of the application time,
wherein the application time is associated with a switch between a half-duplex pattern and an SBFD pattern, and is at least one of:
  defined in connection with switching between a target bandwidth part (BWP) switching delay type and a source BWP switching delay type, or
  is dependent on the target BWP switching delay type.

12. The method of claim 11, wherein the start time coincides with at least one of:
an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, an end of a first acknowledgment (ACK) associated with the MAC-CE, or an end of a second ACK associated with the DCI.

13. The method of claim 11, further comprising:

receiving or transmitting a downlink communication or an uplink communication, respectively, according to the SBFD pattern, in configured downlink/uplink (DL/UL) bandwidth parts (BWPs) following the expiration of the application time counted from the start time.

14. The method of claim 11, wherein the SBFD pattern corresponding to a non-contiguous downlink bandwidth part (BWP) and an uplink BWP is a fixed pattern, and center frequencies of the non-contiguous downlink bandwidth part (BWP) and the uplink BWP are aligned.

15. The method of claim 11, wherein the application time is dependent on a first subcarrier spacing associated with a downlink communication and a second subcarrier spacing associated with an uplink communication.

16. The method of claim 11, further comprising:

receiving a configuration allocating the application time, the configuration based on a capability of the wireless communication device per downlink/uplink bandwidth part (DL/UL BWP)-subcarrier spacing pair.

17. The method of claim 11, wherein the application time is associated with the switch between the half-duplex pattern and the SBFD pattern, and the application time is fixed.

18. The method of claim 11, further comprising:

receiving a configuration corresponding to multiple bandwidth parts (BWPs) associated with the half-duplex pattern and the SBFD pattern, the configuration based on a capability of the wireless communication device per downlink/uplink bandwidth part (DL/UL BWP)-subcarrier spacing pair and for a given source or target BWP type.

19. The method of claim 11, wherein:

the SBFD pattern is comprised of a plurality of subbands, each of the plurality of subbands having a different center frequency.

20. The method of claim 11, wherein the application time is associated with a change in bandwidth associated with the switch between the half-duplex pattern and the SBFD pattern and is dependent upon whether values of non-bandwidth part (non-BWP) related baseband parameters change in response to the switch between the half-duplex pattern and the SBFD pattern.

21. A network entity, comprising:

one or more memories; and one or more processors coupled to the one or more memories, the one or more processors being configured to:

transmit, from the network entity, at least one of a semi-persistent subband full-duplex (SBFD) indication or an aperiodic SBFD indication; and receive an uplink symbol at, or transmit a downlink symbol from, the network entity in an SBFD mode following an expiration of an application time counted from a start time of the transmitting of the at least one of the semi-persistent SBFD indication or the aperiodic SBFD indication, wherein the application time is associated with a switch between a half-duplex pattern and an SBFD pattern, and is at least one of:

defined in connection with switching between a target bandwidth part (BWP) switching delay type and a source BWP switching delay type, or is dependent on the target BWP switching delay type.

22. The network entity of claim 21, wherein the start time coincides with at least one of:

an end of a medium access control-control element (MAC-CE) carrying the at least one of the semi-persistent or the aperiodic SBFD indication, an end of a radio resource control (RRC) cell common indication carrying the at least one of the semi-persistent or the aperiodic SBFD indication, an end of a downlink control information (DCI) carrying the at least one of the semi-persistent or the aperiodic SBFD indication, an end of a first acknowledgment (ACK) associated with the MAC-CE, or an end of a second ACK associated with the DCI.

23. The network entity of claim 21, wherein the one or more processors are further configured to:

receive and transmit an uplink communication and a downlink communication, respectively, according to the SBFD pattern, in configured downlink/uplink (DL/UL) bandwidth parts (BWPs) following the expiration of the application time counted from the start time.

24. The network entity of claim 21, wherein the SBFD pattern corresponding to a non-contiguous downlink bandwidth part (BWP) and an uplink BWP is a fixed pattern, and center frequencies of the non-contiguous downlink bandwidth part (BWP) and the uplink BWP are aligned.

25. The network entity of claim 21, wherein the application time is dependent on a first subcarrier spacing associated with a downlink communication and a second subcarrier spacing associated with an uplink communication.

26. The network entity of claim 21, wherein the one or more processors are further configured to:

transmit a configuration allocating the application time, the configuration based on a capability of a wireless communication device per downlink/uplink bandwidth part (DL/UL BWP)-subcarrier spacing pair.

27. The network entity of claim 21, wherein the application time is associated with the switch between the half-duplex pattern and the SBFD pattern, and the application time is fixed.

28. The network entity of claim 21, wherein:

the SBFD pattern is comprised of a plurality of subbands, each of the plurality of subbands having a different center frequency.

29. The network entity of claim 21, wherein the application time is associated with a change in bandwidth associated with the switch between the half-duplex pattern and the SBFD pattern and is dependent upon whether values of non-bandwidth part (non-BWP) related baseband parameters change in response to the switch between the half-duplex pattern and the SBFD pattern.

30. The network entity of claim 21, wherein the one or more processors are further configured to:

transmit a configuration corresponding to multiple bandwidth parts (BWPs) associated with the half-duplex pattern and the SBFD pattern, the configuration based on a capability of a wireless communication device per downlink/uplink bandwidth part (DL/UL BWP)-sub-carrier spacing pair and for a given source or target BWP type.

\* \* \* \* \*